(12) United States Patent  (10) Patent No.: US 8,537,126 B2
Yousefpor et al.  (45) Date of Patent: Sep. 17, 2013

(54) INTEGRATED TOUCH SENSITIVE DISPLAY GATE DRIVER

(75) Inventors: Marduke Yousefpor, San Jose, CA (US); Shih Chang Chang, Cupertino, CA (US); Kevin J. White, Los Gatos, CA (US); Steven Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1062 days.

(21) Appl. No.: 12/545,669

(22) Filed: Aug. 21, 2009

(65) Prior Publication Data

US 2010/0253638 A1  Oct. 7, 2010

Related U.S. Application Data

(60) Provisional application No. 61/167,129, filed on Apr. 6, 2009, provisional application No. 61/187,149, filed on Jun. 15, 2009, provisional application No. 61/220,566, filed on Jun. 25, 2009.

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| 5,483,261 | A | 1/1996 | Yasutake |
| 5,488,204 | A | 1/1996 | Mead et al. |
| 5,825,352 | A | 10/1998 | Bisset et al. |
| 5,835,079 | A | 11/1998 | Shieh |
| 5,880,411 | A | 3/1999 | Gillespie et al. |
| 6,188,391 | B1 | 2/2001 | Seely et al. |
| 6,239,788 | B1 | 5/2001 | Nohno et al. |
| 6,310,610 | B1 | 10/2001 | Beaton et al. |
| 6,323,846 | B1 | 11/2001 | Westerman et al. |
| 6,690,387 | B2 | 2/2004 | Zimmerman et al. |
| 7,015,894 | B2 | 3/2006 | Morohoshi |
| 7,184,064 | B2 | 2/2007 | Zimmerman et al. |
| 7,663,607 | B2 | 2/2010 | Hotelling et al. |

(Continued)

FOREIGN PATENT DOCUMENTS

| CN | 101017419 A | 8/2007 |
| EP | 1 455 264 A2 | 9/2004 |

(Continued)

OTHER PUBLICATIONS

Great Britain Search Report mailed Jul. 30, 2010, for GB Application No. GB1005466.6, filed Mar. 31, 2010, three pages.

(Continued)

*Primary Examiner* — Adam R Giesy
*Assistant Examiner* — Henok Heyi
(74) *Attorney, Agent, or Firm* — Morrison & Foerster LLP

(57) ABSTRACT

A gate driver circuit for switching gate line voltage supplies between display and touch modes is disclosed. The circuit can include one or more switches configured to switch one or more gate lines of an integrated touch sensitive display between a display mode and a touch mode. During touch mode, the circuit can be configured to switch the gate lines to connect to a more stable voltage supply. The circuit can also be configured to reduce or eliminate interference from the display circuitry to the touch circuitry that could affect touch sensing. During display mode, the circuit can be configured to switch the gate lines to connect to a fluctuating voltage supply.

25 Claims, 25 Drawing Sheets

(56) References Cited

U.S. PATENT DOCUMENTS

| | | |
|---|---|---|
| 2004/0227743 A1 | 11/2004 | Brown |
| 2005/0088395 A1 | 4/2005 | Chung |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2008/0062139 A1* | 3/2008 | Hotelling et al. ............ 345/173 |
| 2009/0146964 A1* | 6/2009 | Park et al. .................... 345/173 |
| 2009/0167718 A1 | 7/2009 | Lee et al. |
| 2009/0256816 A1* | 10/2009 | Kim ............................. 345/174 |
| 2010/0053112 A1* | 3/2010 | Chen ............................ 345/174 |
| 2010/0134427 A1* | 6/2010 | Tsai et al. ..................... 345/173 |
| 2010/0134429 A1* | 6/2010 | You et al. ..................... 345/173 |

FOREIGN PATENT DOCUMENTS

| | | |
|---|---|---|
| EP | 1 455 264 A3 | 9/2004 |
| EP | 1 455 264 B1 | 9/2004 |
| JP | 2000-163031 A | 6/2000 |
| JP | 2002-342033 A | 11/2002 |
| WO | WO-2004/023440 A2 | 3/2004 |
| WO | WO-2007/003108 A1 | 1/2007 |
| WO | WO-2007/146779 A2 | 12/2007 |
| WO | WO-2007-146779 A3 | 12/2007 |
| WO | WO-2010/117885 A2 | 10/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," Chi ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Great Britain Search Report mailed Aug. 17, 2012, for GB Application No. GB1005466.6, filed Mar. 31, 2010, one page.

International Search Report mailed Jul. 4, 2011, for PCT Application No. PCT/US2010/029702, filed Apr. 1, 2010, four pages.

* cited by examiner

INTEGRATED TOUCH SENSITIVE DISPLAY GATE DRIVER

CROSS REFERENCE TO RELATED APPLICATIONS

This application claims benefit of U.S. Provisional Application No. 61/167,129, filed Apr. 6, 2009, U.S. Provisional Application No. 61/187,149, filed Jun. 15, 2009, and U.S. Provisional Application No. 61/220,566, filed Jun. 25, 2009, the contents of which are incorporated by reference herein in their entirety for all purposes.

FIELD

This relates to touch sensitive displays having display and touch modes and, more particularly, to gate driver circuitry in integrated touch sensitive displays switchable between display and touch modes.

BACKGROUND

Many types of input devices are available for performing operations in a computing system, such as buttons or keys, mice, trackballs, touch sensor panels, joysticks, touch pads, touch screens, and the like. Touch screens, in particular, are becoming increasingly popular because of their ease and versatility of operation as well as their declining price. Touch screens can include a touch sensor panel, which can be a clear panel with a touch sensitive surface, and a display device such as a liquid crystal display (LCD) that can be positioned behind the panel so that the touch sensitive surface can substantially cover the viewable area of the display device. Touch screens can generally allow a user to perform various functions by touching or near touching the touch sensor panel using one or more fingers, a stylus or other object at a location dictated by a user interface (UI) including virtual buttons, keys, bars, displays, and other elements, being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Because display and touch capabilities can impose different requirements on the touch screen, it can be challenging to mesh those requirements so that the touch screen can perform both display and touch capabilities effectively and efficiently.

SUMMARY

This relates to an integrated touch sensitive display having switchable gate driver circuitry for switching between gate line voltage supplies during display and touch modes of the display. The gate driver circuitry can include one or more switches configured to switch to a voltage supply from an LCD driver during display mode for displaying image and/or graphics data and to switch to a voltage supply from a touch controller during touch mode for reducing interference of the LCD voltage supply with touch circuitry during touch sensing. In some embodiments, the voltage from the touch controller during touch mode can be ground voltage. In some embodiments, the gate driver circuitry can include a feedback loop and logic state circuitry to reduce interference from display circuitry during touch mode. In some embodiments, the gate driver circuitry can include clock circuitry to disable the display clocks during touch mode so as to reduce interference from the clock signals. In some embodiments, the gate driver circuitry can be adjacent to or in close proximity to an active display/touch area of the display. In some embodiments, the gate driver circuitry can be distant from the active area with conductive lines therebetween to shield the active area from the gate driver as a further interference reduction measure. The switchable gate driver circuitry can advantageously integrate display and touch circuitry in a more efficient effective manner, thereby realizing cost and power savings.

BRIEF DESCRIPTION OF THE DRAWINGS

FIGS. 17-1 and 17-2 illustrate an exemplary layout of an integrated touch sensitive display according to various embodiments.

DETAILED DESCRIPTION

Figure 1:
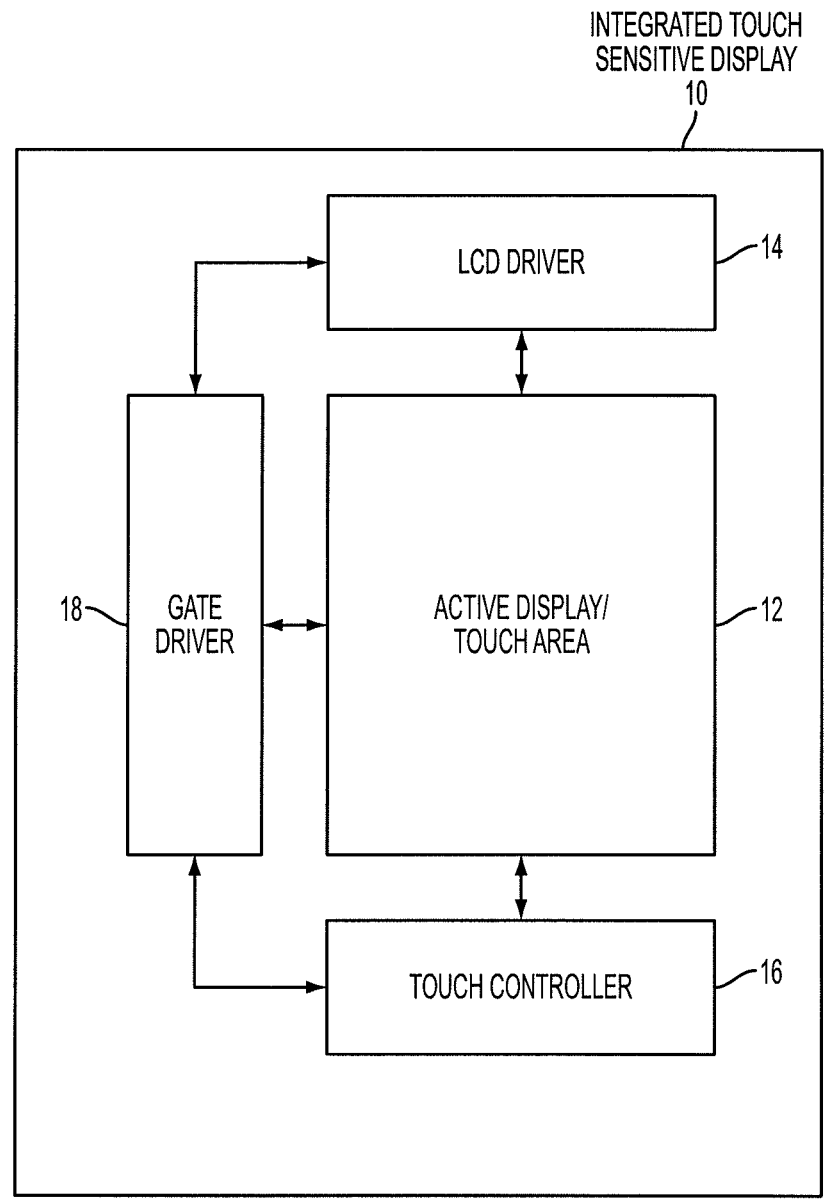
FIG. 1 illustrates an exemplary integrated touch sensitive display with switchable gate driver circuitry according to various embodiments.

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to an integrated touch sensitive display having switchable gate driver circuitry for switching between gate line voltage supplies during display and touch modes of the display. In some embodiments, the gate driver circuitry can include one or more switches configured to switch to a voltage supply from an LCD driver during display mode for displaying image and/or graphics data and to switch to a voltage supply from a touch controller during touch mode for reducing the LCD voltage supply interfering with touch circuitry during touch sensing. In some embodiments, the voltage from the touch controller during touch mode can be ground voltage. In some embodiments, the gate driver circuitry can include a feedback loop and logic state circuitry to reduce interference from display circuitry during touch mode. In some embodiments, the gate driver circuitry can include clock circuitry to disable the display clocks during touch mode so as to reduce interference from the clock signals. In some embodiments, the gate driver circuitry can be adjacent to or in close proximity to an active display/touch area of the display. In some embodiments, the gate driver circuitry can be distant from the active display/touch area of the display with conductive lines therebetween to shield the active area from the gate driver to further reduce interference with touch circuitry during touch sensing.

The switchable gate driver circuitry can advantageously integrate display and touch circuitry with little or no complications to the LCD voltage supply circuitry and can allow for a more stable voltage supply when needed for more sensitive operations, e.g., during touch operations. This can result in a more efficient, effective touch sensitive display that can save power by not having to correct or repeat erroneous or false touch sensing. Also, the switchable gate driver circuitry can be easily plugged into existing technology with little expense or circuit re-design, thereby saving costs. The switchable gate driver circuitry can be compactly formed, disposed, and/or integrated with display and touch circuitry on a single LCD chip, thereby providing a thinner, smaller chip. In some embodiments, the circuitry can be partially or fully in either an application specific integrated circuit (ASIC) or on LCD glass electronics separate from the chip.

The terms "drive line," "horizontal common voltage line," and "xVcom" can refer to the horizontal conductive lines of the display. In most cases, though not always, the term "drive line" can be used when referring to these conductive lines in the drive regions of the display because they can be used to transmit a stimulation signal to drive the drive regions during touch sensing.

The terms "sense line," "vertical common voltage line," and "yVcom" can refer to the vertical conductive lines of the display. In most cases, though not always, the term "sense line" can be used when referring to these conductive lines in the sense regions of the display because they can be used to transmit a touch signal to sense a touch or near touch on the display during touch sensing.

The term "subpixel" can refer to a red, green, or blue display component of the display, while the term "pixel" can refer to a combination of a red, a green, and a blue subpixel. However, various embodiments are not restricted to red-green-blue (RGB) displays and can include other types of displays, such as monochrome displays.

Although some embodiments may be described herein in terms of integrated touch sensitive displays, it should be understood that the various embodiments are not so limited, but can be generally applicable to devices utilizing display capabilities during display mode and touch capabilities during touch mode. It is also to be understood that various embodiments are not limited to displays having display and touch modes, but can be generally applicable to displays having other operating modes, such as scan mode, audio mode, text mode, etc. It is further to be understood that the switching circuitry can be incorporated into a display with an overlaying touch sensor panel, i.e., a touch screen, or into a display with a touch sensor panel integrated therein, i.e., an integrated touch screen.

FIG. 1 illustrates an exemplary integrated touch sensitive display with switchable gate driver circuitry according to various embodiments. In the example of FIG. 1, integrated touch sensitive display 10 can include LCD driver 14 to drive displaying, active display/touch area 12 to display data and to sense touch, touch controller 16 to drive touch sensing, and switchable gate driver 18 to drive gate lines of the display.

These components will be described in more detail below in FIG. 2. The display 10 can operate in two modes—a display mode and a touch mode. The display mode can include displaying image and/or graphics data on circuitry, e.g., pixels, in the active area 12 of the display 10. The touch mode can include sensing touch or near touch by circuitry, e.g., pixels, in the active area 12 of the display 10. The pixels will be described in more detail below in FIG. 3. Other operating modes can also be used, such as a scan mode, an audio mode, a text mode, etc., according to the needs of the display.

The gate driver 18 can include circuitry to switch between a voltage supply from the LCD driver 14 and a voltage supply from the touch controller 16 to drive gate lines in the active area 12 of the display 10 based on the mode. In this way, for example, a more stable voltage supply can be used when needed for more sensitive operations, e.g., during touch mode.

Example circumstances in which a fluctuating voltage supply can occur can be as follows. The LCD driver 14 can be configured to drive the active area 12 during display mode. However, some signals of the LCD driver 14 can remain active during the touch mode. For example, when the display pixels are not refreshing with new data, e.g., during touch mode, the display 10 can be configured to continue displaying the current data so that the display is not blank. To do so, the LCD driver 14 can transmit a low or shutdown voltage to the gate driver 18, which can transmit the voltage along gate lines of the display to circuitry of the display pixels in order to keep the pixels so that the pixels cannot display new data, while storage capacitors in the active area 12 can be used to continue displaying the current data. This can be referred to as vertical blanking of the display 10.

Because certain signals of the LCD driver 14 can be poorly grounded due in part to the glass substrate on which typical LCD drivers can be built, the LCD voltage to the gate driver 18 can fluctuate due to fluctuations in the LCD reference voltage with respect to touch circuitry ground. This can have little or no effect during display mode because most or all of the signals driving the display can be referenced to the same LCD driver ground, such that the signals cannot see or be affected by the ground fluctuations of the LCD driver. However, during touch mode, these ground fluctuations can be injected through the gate driver 18 parasitic coupling with drive and sense lines, indium-tin-oxide (ITO) plates, etc., into touch circuitry, where they can mistakenly be sensed as a touch or near touch on the display 10.

In contrast, the touch circuitry signals can be well-grounded to ensure effective touch sensing. As such, a DC shutdown voltage from the touch circuitry to the gate driver 18 can have little or no fluctuations that could adversely influence the touch circuitry during touch mode.

Accordingly, in the example of FIG. 1, the gate driver 18 can be switched to drive the gate lines with voltage received from the LCD driver 14 (which may or may not fluctuate) during display mode and can be switched to drive the gate lines with voltage received from the touch controller 16 (which may not fluctuate) during the touch modes to reduce interference by the LCD driver signals on the touch circuitry during touch mode.

The gate driver switching can occur during vertical blanking as well as other operating conditions of the display, including conditions under which the display cannot refresh, as in vertical blanking, when the display is idle, etc., as well as conditions under which the display can refresh, as in during display mode, when associated algorithms execute, etc.

It is to be understood that the above circumstances are not the only ones in which fluctuating voltage can occur. Nor should fluctuating voltage be considered the only circumstances under which various embodiments can be applied. Rather other circumstances where different voltages and/or voltage characteristics are preferred can benefit from the various embodiments described herein. For example, a noisy LCD voltage can be replaced with a cleaner touch voltage to the gate driver; a fading LCD voltage can be replaced with a stronger touch voltage to the gate driver; a lost LCD voltage can be replaced with a present touch voltage to the gate driver; an LCD voltage that produces poorer touch sensing, e.g., by increasing parasitic capacitance, can be replaced with a touch voltage that produces better touch sensing, e.g., by reducing parasitic capacitance; and so on. A touch voltage causing undesirable effects in the display can also be replaced with an LCD voltage. In addition to or alternate to the LCD voltage supply and/or the touch voltage supply, other voltage supplies available to the display can also be switchably used according to various embodiments.

It is further to be understood that an integrated touch sensitive display according to various embodiments is not limited to the components and configuration illustrated in FIG. 1, but can include additional or other components in the same or different configurations capable of performing according to various embodiments.

Figure 2:
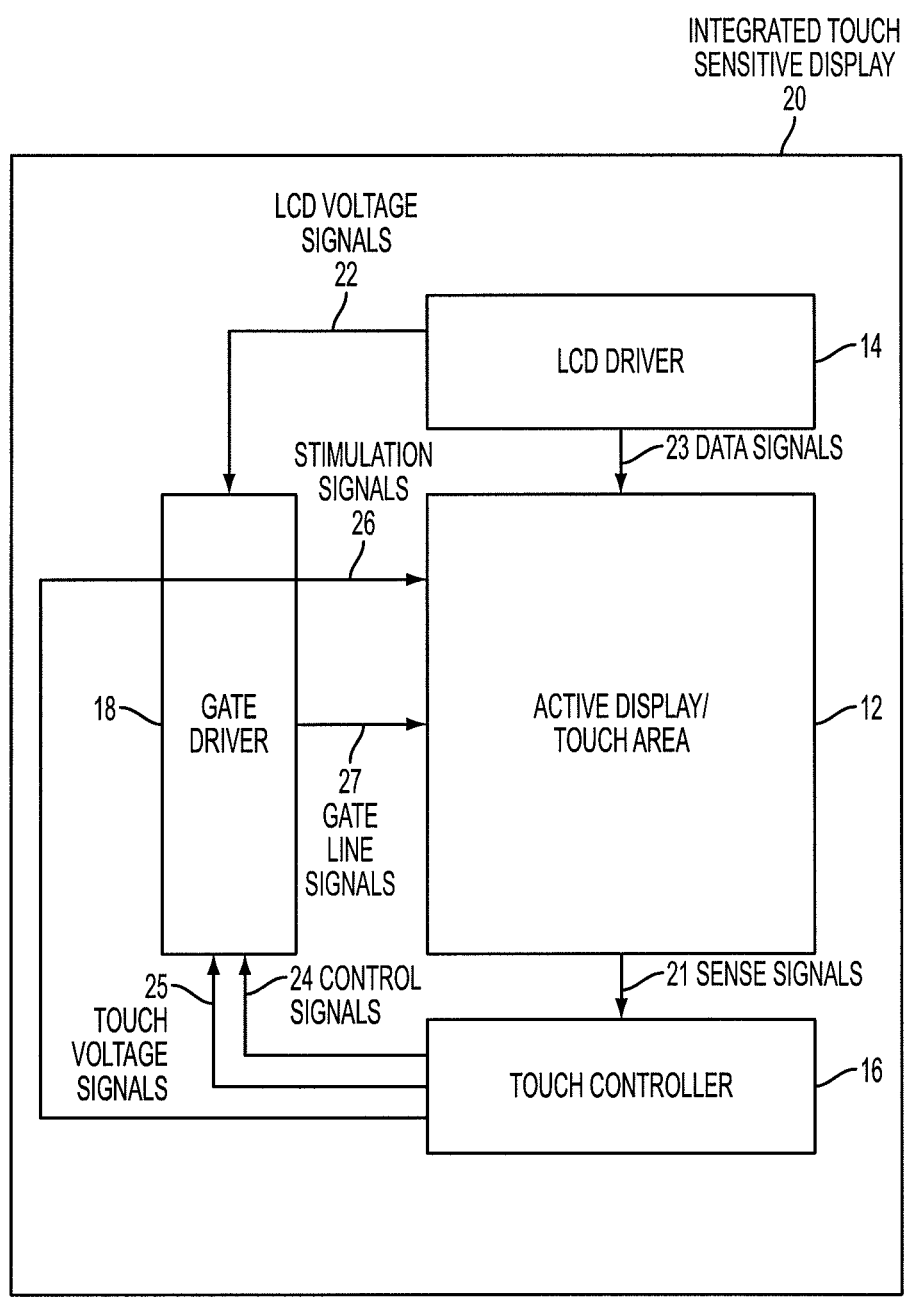
FIG. 2 illustrates an exemplary integrated touch sensitive display with switchable gate driver circuitry proximate to an active display/touch area of the display according to various embodiments.

FIG. 2 illustrates an exemplary integrated touch sensitive display with switchable gate driver circuitry proximate to an active display/touch area of the display according to various embodiments. In the example of FIG. 2, integrated touch sensitive display 20 can include active display/touch area 12, LCD driver 14, touch controller 16, and gate driver 18. The components can be electrically connected to or in communication with each other.

The active display/touch area 12 can integrate display and touch capabilities in circuitry, e.g., pixels, which can be used to display images and/or graphics during a display mode of the display and which can be used to sense a touch or near touch on the display during a touch mode. The active display/touch area 12 can receive image and/or graphics data signals 23 from the LCD driver 14 and LCD voltage signals 27 from the gate driver 18 for displaying the data on the pixels during the display mode. The active display/touch area 12 can receive stimulation signals 26 from the touch controller 16 to stimulate the pixels to sense a touch or near touch during the touch mode. The active display/touch area 12 can receive touch voltage signals 27 from the gate driver 18 for reducing interference from the LCD driver 14 during touch mode. The active display/touch area 12 can also transmit sense signals 21 indicating a touch or near touch to the touch controller 16 for processing during the touch mode.

The LCD driver 14 can drive data lines of the active area 12 and can cause the gate driver 18 to drive gate lines of the active area for displaying image and/or graphics data transmitted on the data lines during the display mode. The LCD driver 14 can transmit the image and/or graphics data signals 23 to the active area 12 and can transmit the LCD voltage signals 22 (and other signals) to the gate driver 18 during the display mode. The LCD driver 14 can also transmit the LCD voltage signals 22 (and other signals) to the gate driver 18 during the touch mode, where the signals can be omitted or ignored according to various embodiments.

The touch controller 16 can drive the active area 12 to sense touch or near touch on the display 20 and can cause the gate driver 18 to drive gate lines of the active area so that the display circuitry does not interfere with the touch circuitry during the touch mode. The touch controller 16 can transmit the stimulation signals 26 to the active area 12 to stimulate the pixels to sense touch or near touch during the touch mode.

The touch controller 16 can also transmit touch voltage signals 25 to the gate driver 18, which the gate driver can use to drive the gate lines in the active area 12 during touch mode. The touch controller 16 can transmit control signals 24 to the gate driver 18 to control the gate driver switching between the LCD voltage signals 22 and the touch voltage signals 25 during the display and touch modes. The touch controller 16 can receive the sense signals 21 from the active area 12 during touch mode. In some embodiments, the touch controller 16 can be based on capacitance. By detecting changes in capacitance at each of the pixels and noting the position of the pixels, the touch controller 16 can recognize multiple objects and determine one or more of the location, pressure, direction, speed, and acceleration of the objects as they are moved across the display 20. By way of example, some embodiments can be based on self capacitance and some embodiments can be based on mutual capacitance. In some embodiments, the display 20 can be multi-touch, single touch, projection scan, full-imaging multi-touch, or any capacitive touch.

The gate driver 18 can drive gate lines of the active area 12. The gate driver 18 can be disposed adjacent to or in close proximity with the active area 12. The gate driver 18 can be proximate to either side of the active area. In some embodiments, a second gate driver can be included, such that two gate drivers are proximate to both sides of the active area. The gate driver 18 can receive the LCD voltage signals 22 from the LCD driver 14 and the touch voltage signals 25 from the touch controller 16. The gate driver 18 can also receive the control signals 24 from the touch controller 16 to control switching between the LCD voltage signals 22 and the touch voltage signals 25. During the display mode, the gate driver 18 can switch the LCD voltage signals 22 to be transmitted as the gate line signals 27 to the gate lines of the active area 12 to activate the pixels to display images and/or graphics on the display 20. During the touch mode, the gate driver 18 can switch the touch voltage signals 25 to be transmitted as the gate line signals 27 to the gate lines of the active area 12 to reduce interference of the LCD voltage signals 22 with touch circuitry.

The gate driver 18 can switch between the voltage supplies when the voltage supply becomes incompatible with operating conditions of the display 20. In some embodiments, the gate driver 18 can switch between the voltage supplies based on the mode of the display 20. In some embodiments, the gate driver 18 can switch between the voltage supplies when the voltage supply goes beyond a certain limit. For example, a gate line voltage from one supply can become too high or too low, causing the gate driver 18 to switch to a gate line voltage from another supply within acceptable limit. In some embodiments, the gate driver 18 can switch between the voltage supplies when the voltage supply fluctuates too much. For example, the touch controller 16 (or another display component) can measure the fluctuation range of the voltage supply and switch to another voltage supply if the range exceeds a particular range. In some embodiments, the gate driver 18 can switch between the voltage supplies when the parasitic capacitance on the touch circuitry becomes too high. For example, the touch controller 16 (or another display component) can monitor the capacitance with the current voltage supply and switch to another voltage supply if the amount exceeds a particular limit. In some embodiments, the gate driver 18 can switch at will and/or as needed.

Although the touch controller outputs the control signals in this example, other components can output the control signals, e.g., the LCD driver or another component in the display circuitry, another component in the touch circuitry, a combination of the touch controller and the LCD driver, a combination of the LCD driver and another component, a combination of the touch controller and another component, and so on. In some embodiments, the gate driver 18 can control which voltage signals to transmit.

Each stimulation signal 26 can stimulate a corresponding drive line or multiple drive lines. Each gate line signal 27 can drive a corresponding gate line. Each data signal 23 can drive a corresponding data line. Each sense signal 21 can transmit information of a sensed touch or near touch on a corresponding sense line.

In additional to or alternative to reducing interference from the LCD driver during touch mode, the gate driver can switch from the LCD voltage to the touch voltage to reduce noise in the voltage, to reduce parasitic capacitance in the active area, to replace a fading and/or lost voltage signal, and so on. The gate driver can also switch from the touch voltage to the LCD voltage to reduce undesirable effects on the display. The gate driver can further switch to other voltage supplies available to the display.

It is to be understood that an integrated touch sensitive display according to various embodiments is not limited to the components and configuration illustrated in FIG. 2, but can include additional or other components in the same or different configurations capable of performing according to the various embodiments.

Figure 3:
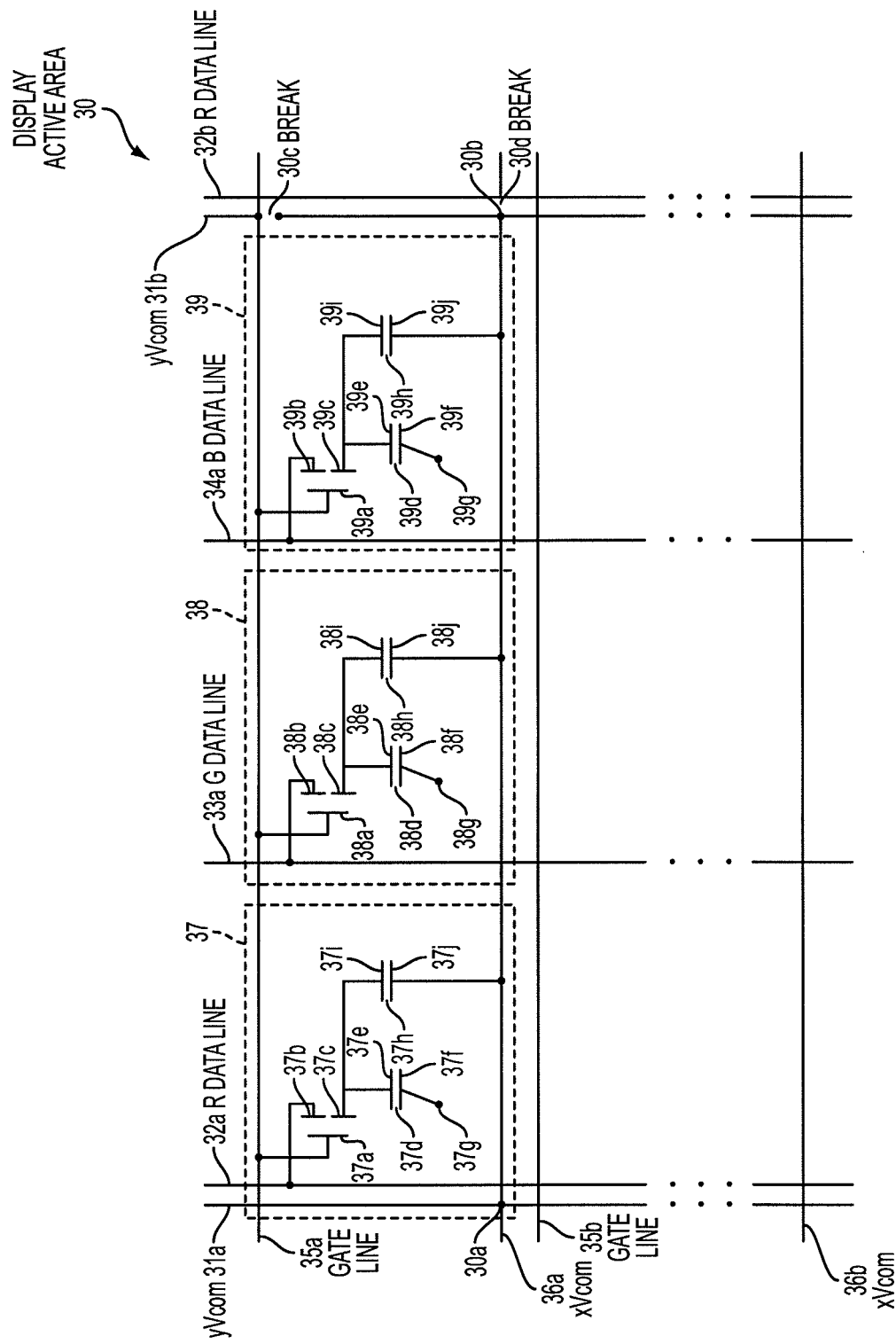
FIG. 3 illustrates a partial circuit diagram of an exemplary pixel in an active display/touch area of an integrated touch sensitive display having display and touch modes which can include switchable circuitry according to various embodiments.

FIG. 3 illustrates a partial circuit diagram of an exemplary pixel of an active display/touch area of an integrated touch sensitive display having display and touch modes which can include switchable gate driver circuitry according to various embodiments. In the example of FIG. 3, active display/touch area 30 can include LCD subpixels according to various embodiments. The subpixels of the active area 30 can be configured such that they can be capable of dual-functionality as both display subpixels and touch sensor elements. That is, the subpixels can include circuit elements, such as capacitive elements, electrodes, etc., that can operate as part of the display circuitry of the pixels and that can also operate as elements of touch sensing circuitry. In this way, active area 30 can operate as a display with integrated touch sensing capability. FIG. 3 shows details of subpixels 37, 38, and 39 of active area 30. Note that each of the subpixels can represent either red (R), green (G) or blue (B), with the combination of all three R, G and B subpixels forming a single color pixel.

Subpixel 38 can include thin film transistor (TFT) with gate 38a, source 38b, and drain 38c. Subpixel 38 can also include storage capacitor, Cst 38h, with upper electrode 38i and lower electrode 38j, liquid crystal capacitor, Clc 38d, with subpixel electrode 38e and common electrode 38f, and color filter voltage source, Vcf 38g. If a subpixel is an in-plane-switching (IPS) device, Vcf can be, for example, a fringe field electrode connected to a common voltage line in parallel with Cst 38h. If a subpixel does not utilize IPS, Vcf 38g can be, for example, an indium-tin-oxide (ITO) layer on the color filter glass. Subpixel 38 can also include a portion of a data line for green (G) color data, Gdata line 33a, and a portion of gate line 35a. Gate 38a can be connected to gate line portion 35a, and source 38c can be connected to Gdata line portion 33a. Upper electrode 38i of Cst 38h can be connected to drain 38c of TFT 38, and lower electrode 38j of Cst 38h can be connected to a portion of a common voltage line that runs in the x-direction, xVcom 36a. Subpixel electrode 38e of Clc 38d can be connected to drain 38c of TFT 38, and common electrode 38f of Clc 38d can connected to Vcf 38g.

The circuit diagram of subpixel 39 can be identical to that of subpixel 38. However, as shown in FIG. 3, color data line 34*a* running through subpixel 39 can carry blue (B) color data. Subpixels 38 and 39 can be, for example, known display subpixels.

Similar to subpixels 38 and 39, subpixel 37 can include thin film transistor (TFT) 37 with gate 37*a*, source 37*b*, and drain 37*c*. Subpixel 37 can also include storage capacitor, Cst 37*h*, with upper electrode 37*i* and lower electrode 37*j*, liquid crystal capacitor, Clc 37*d*, with subpixel electrode 37*e* and common electrode 37*f*, and color filter voltage source, Vcf 37*g*. Subpixel 37 can also include a portion of a data line for red (R) color data, Rdata line 32*a*, and a portion of gate line 35*a*. Gate 37*a* can be connected to gate line portion 35*a*, and source 37*b* can be connected to Rdata line portion 32*a*. Upper electrode 37*i* of Cst 37*h* can be connected to drain 37*c* of TFT 37, and lower electrode 37*j* of Cst 37*h* can be connected to a portion of xVcom 36*a*. Subpixel electrode 37*e* of Clc 37*d* can be connected to drain 37*c* of TFT 37, and common electrode 37*f* of Clc 37*d* can be connected to Vcf 37*g*.

Unlike subpixels 38 and 39, subpixel 37 can also include a portion of a common voltage line running in the y-direction, yVcom 31*a*. In addition, subpixel 37 can include a connection 30*a* that connects portion of yVcom 31*a* to portion of xVcom 36*a*. Thus, connection 30*a* can connect xVcom 36*a* and yVcom 31*a*.

A subpixel (only partially shown at the right in FIG. 3) can be similar to subpixel 37, except that a portion of yVcom 31*b* can have a break (open) 30*c*, and a portion of xVcom 36*a* can have a break 30*d*.

As can be seen in FIG. 3, the lower electrodes of storage capacitors of subpixels 37, 38, and 39 can be connected together by xVcom 36*a*. This can be, for example, a type of connection in known display panels and, when used in conjunction with known gate lines, data lines, and transistors, can allow subpixels to be addressed. The addition of vertical common voltage lines along with connections to the horizontal common voltage lines can allow grouping of subpixels in both the x-direction and y-direction, as described in further detail below. For example, yVcom 31*a* and connection 30*a* to xVcom 36*a* can allow the storage capacitors of subpixels 37, 38, and 39 to be connected to storage capacitors of subpixels that are above and below subpixels 37, 38, and 39 (the subpixels above and below are not shown). For example, the subpixels immediately above subpixels 37, 38, and 39 can have the same configurations as subpixels 37, 38, and 39, respectively. In this case, the storage capacitors of the subpixels immediately above subpixels 37, 38, and 39 would be connected to the storage capacitors of subpixels 37, 38, and 39.

In general, an active display/touch area of an integrated touch sensitive display can be configured such that the storage capacitors of all subpixels in the active area can be connected together, for example, through at least one vertical common voltage line with connections to horizontal common voltage lines. Another active area can be configured such that different groups of subpixels can be connected together to form separate regions of connected-together storage capacitors.

One way to create separate regions can be by forming breaks (opens) in the horizontal and/or vertical common lines. For example, yVcom 31*b* of active area 30 can have break 30*c*, which can allow subpixels above the break to be isolated from subpixels below the break. Likewise, xVcom 36*a* can have break 30*d*, which can allow subpixels to the right of the break to be isolated from subpixels to the left of the break.

Touch regions in an active area of an integrated touch sensitive display can be formed by groups of pixels (each pixel including a red, green, and blue subpixel as in FIG. 3) electrically connected together to form drive regions for driving stimulation signals and to form sense regions for sensing a touch or near touch of an object, such as a finger, on the display, during touch mode.

Figure 4:
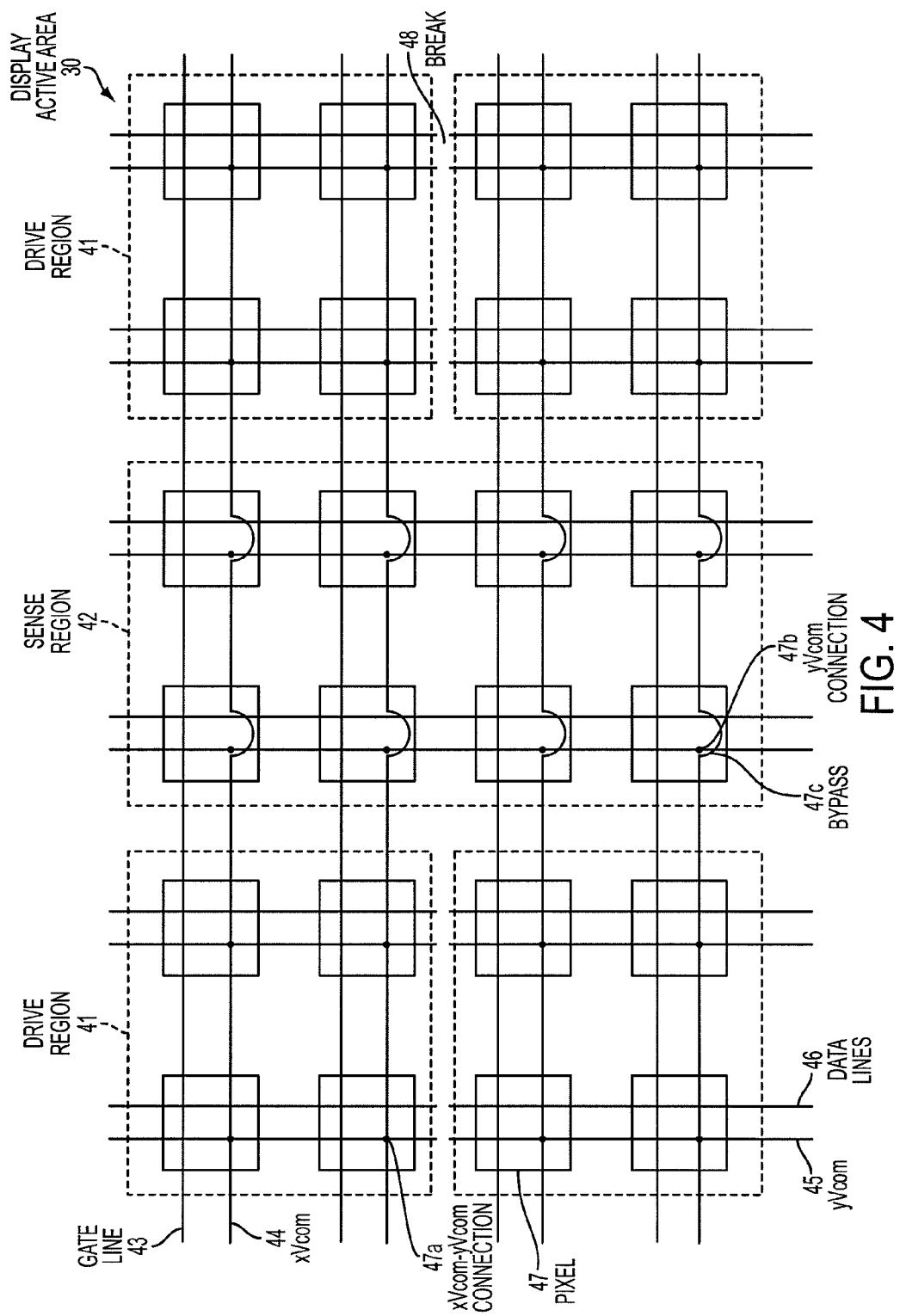
FIG. 4 illustrates an exemplary plan view of an active display/touch area of an integrated touch sensitive display having display and touch modes, in which touch regions, such as drive and sense regions, formed by pixels can have switchable circuitry according to various embodiments.

FIG. 4 illustrates an exemplary plan view of an active display/touch area of an integrated touch sensitive display having display and touch modes, in which touch regions, such as drive and sense regions, formed by pixels can have switchable gate driver circuitry according to various embodiments. In the example of FIG. 4, active display/touch area 40 of an integrated touch sensitive display can have touch regions, which can include drive regions 41 and sense regions 42. Some embodiments can include other regions, such as ground regions between drive regions and/or between a drive region and a sense region. The drive regions 41 and the sense regions 42 can include groups of pixels 47, which can be used to display graphics and data in the display mode and can be used to sense a touch or near touch in the touch mode. For simplicity, each pixel 47 is shown as a single block with a vertical common voltage line yVcom 45, data lines 46 (which can represent R, G, and B data lines), a gate line 43, and a horizontal common voltage line xVcom 44, where each single pixel block can represent a set of red, green, and blue subpixels each having a data line, as shown in FIG. 3.

A drive region 41 can be formed by connecting at least one vertical common voltage line yVcom 45 of a pixel 47 with at least one horizontal common voltage line xVcom 44 of the pixel at xVcom-yVcom connection 47*a*, thereby forming a drive region including a row of pixels. A drive plate (e.g., an ITO plate) can be used to cover the drive region and connect to the vertical and horizontal common voltage lines so as to group the pixels together to form the drive region for touch mode. Generally, a drive region can be larger than a single row of pixels, comparable to the size of a finger tip, for example, in order to effectively receive a touch or near touch in the active area 40 of the display. For example, a drive region can be formed by connecting vertical common voltage lines yVcom with horizontal common voltage lines xVcom, thereby forming a drive region including a matrix of pixels. In some embodiments, drive regions proximate to each other can share horizontal common voltage lines xVcom as drive lines, which can be used to stimulate the drive regions with stimulation signals. In some embodiments, drive regions proximate to each other can share vertical common voltage lines yVcom with breaks 48 in the lines between the drive regions in order to minimize the lines causing parasitic capacitance that could interfere with the received touch or near touch. Optionally and alternatively, the vertical common voltage line breaks can be omitted and the lines shared in their entirety among the drive regions.

In some embodiments, some of the xVcom lines 44 in the drive regions 41 can be connected to the drive plate at connections 47*a*, while others of the xVcom lines 44 in the drive regions 41 can be unconnected from the drive plate. The connected xVcom lines 44 can transmit a positive-phase stimulation signal, while the unconnected xVcom lines can transmit a negative-phase stimulation signal, or vice versa. This can be done to reduce the parasitic capacitance that the xVcom lines 44 can create as they cross under the sense regions 42.

A sense region 42 can be formed by at least one vertical common voltage line yVcom 45 of a pixel, thereby forming a sense region including a column of pixels connected through yVcom connection 47*b*. A sense plate (e.g., an ITO plate) can be used to cover the sense region and connect to the vertical common voltage line so as to group the pixels together to form the sense region for touch mode. Generally, a sense region can be larger than a single column of pixels in order to effectively sense a received touch or near touch on the touch sensitive device. For example, a sense region can be formed by vertical common voltage lines yVcom, thereby forming a sense region including a matrix of pixels. In some embodiments, a sense region can include vertical common voltage lines yVcom as sense lines, which can transmit a touch signal based on a touch or near touch. In the sense region, the vertical common voltage lines yVcom can be unconnected from and can cross over the horizontal common voltage lines xVcom at bypass 47c to form a mutual capacitance structure for touch sensing. This cross over of yVcom and xVcom can also form additional parasitic capacitance between the sense and drive ITO regions that can be minimized.

Each pixel 47 can also include a gate line 43 that can electrically connect to other pixels in the same row. The gate lines 43 can activate the pixels to display an image or graphics during display mode. Each pixel can also include data lines (such as R, G, and B lines as in FIG. 3) which carry the image or graphics displayed during display mode.

In operation during touch mode, the horizontal common voltage lines xVcom 44 can transmit stimulation signals to stimulate the drive regions 41 to form electric field lines between the stimulated drive regions and adjacent sense regions 42. When an object, such as a finger, touches or near touches a stimulated drive region 41, the object can affect some of the electric field lines extending to the adjacent sense regions 42, thereby reducing the amount of charge coupled to these adjacent sense regions. This reduction in charge can be sensed by the sense regions 42 as an "image" of touch. This touch image can be transmitted along the vertical common voltage lines yVcom 45 of the sense regions 42 to touch circuitry for further processing.

In operation during display mode, the gate lines 43 can transmit activation signals to activate the pixels 47 to display image or graphics data being transmitted along the data lines 46.

The drive regions of FIG. 4 are shown as rectangles connected in rows across the active areas of the integrated touch sensitive display and the sense regions of FIG. 4 are shown as rectangles extending the vertical length of the active area. However, the drive and sense regions are not limited to the shapes, orientations, and positions shown, but can include any suitable configurations according to various embodiments. It is to be understood that the pixels used to form the touch regions are not limited to those described above, but can be any suitable pixels having display and touch capabilities according to various embodiments.

Figure 5:
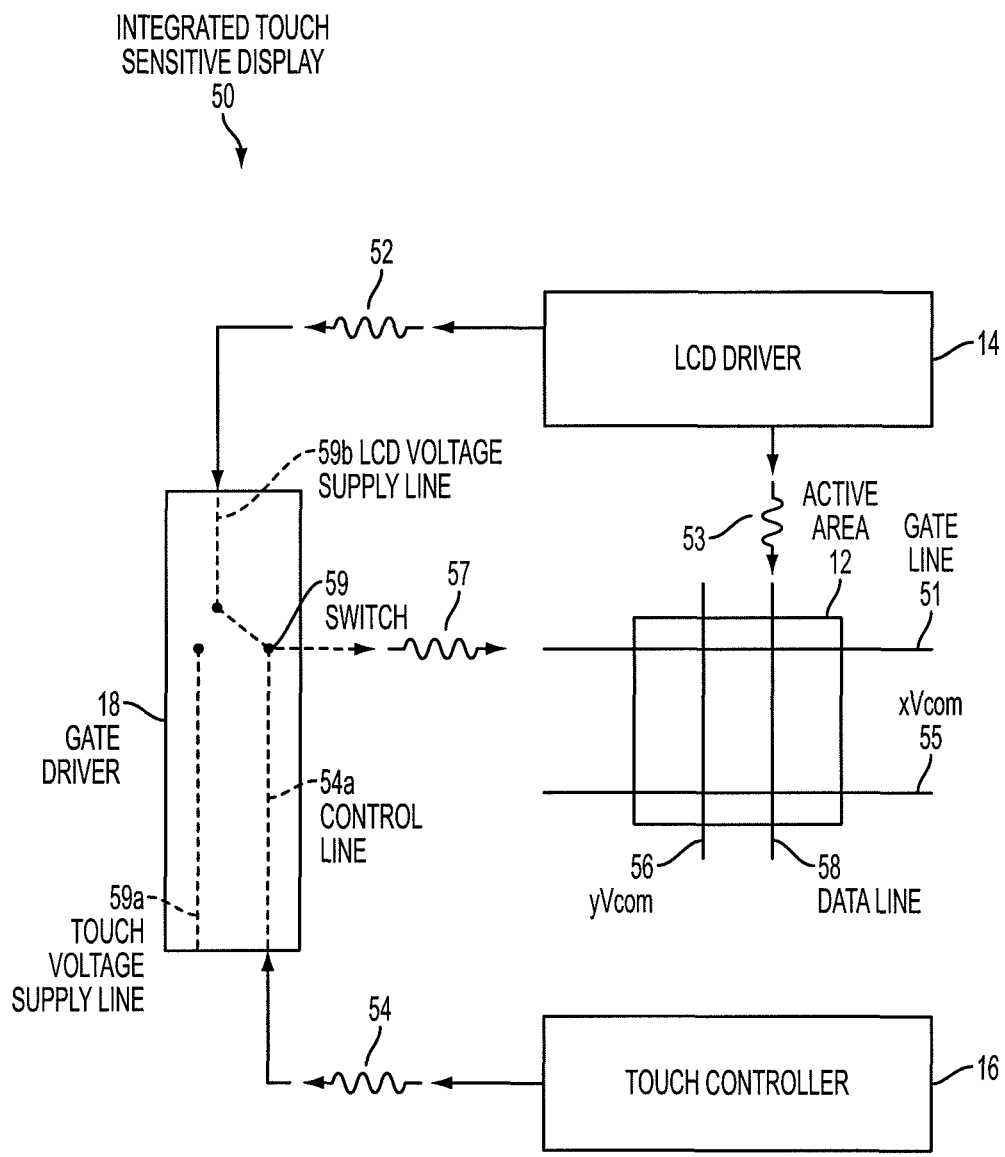
FIG. 5 illustrates an exemplary operation of an integrated touch sensitive display during a display mode, in which circuit elements of the display can operate to display an image on the display.

FIG. 5 illustrates an exemplary operation of an integrated touch sensitive display during a display mode, in which circuit elements of the display can operate to display an image and/or graphics on the display. In the example of FIG. 5, operation during the display mode can include actively configuring the display 50 into a display configuration by, for example, electrically connecting gate driver 18 via switch 59 to LCD voltage supply line 59b, which can electrically disconnect gate driver 18 via the switch 59 from touch voltage supply line 59a. The gate driver 18 can transmit a gate line signal 57 to gate line 51 of the active area 12 to activate the gate line. The LCD driver 14 can transmit a data signal 53 to data line 58 for displaying image and/or graphics on the display pixels in the active area 12 activated by the gate line signal 57. The LCD driver 15 can also transmit an LCD voltage signal 52 to the gate driver 18 for transmitting to the gate line 51. The touch controller 16 can transmit a control signal 54 to the gate driver 18 along control line 54a to the switch 59 to cause the switch to connect to the LCD voltage supply line 59b.

Figure 6:
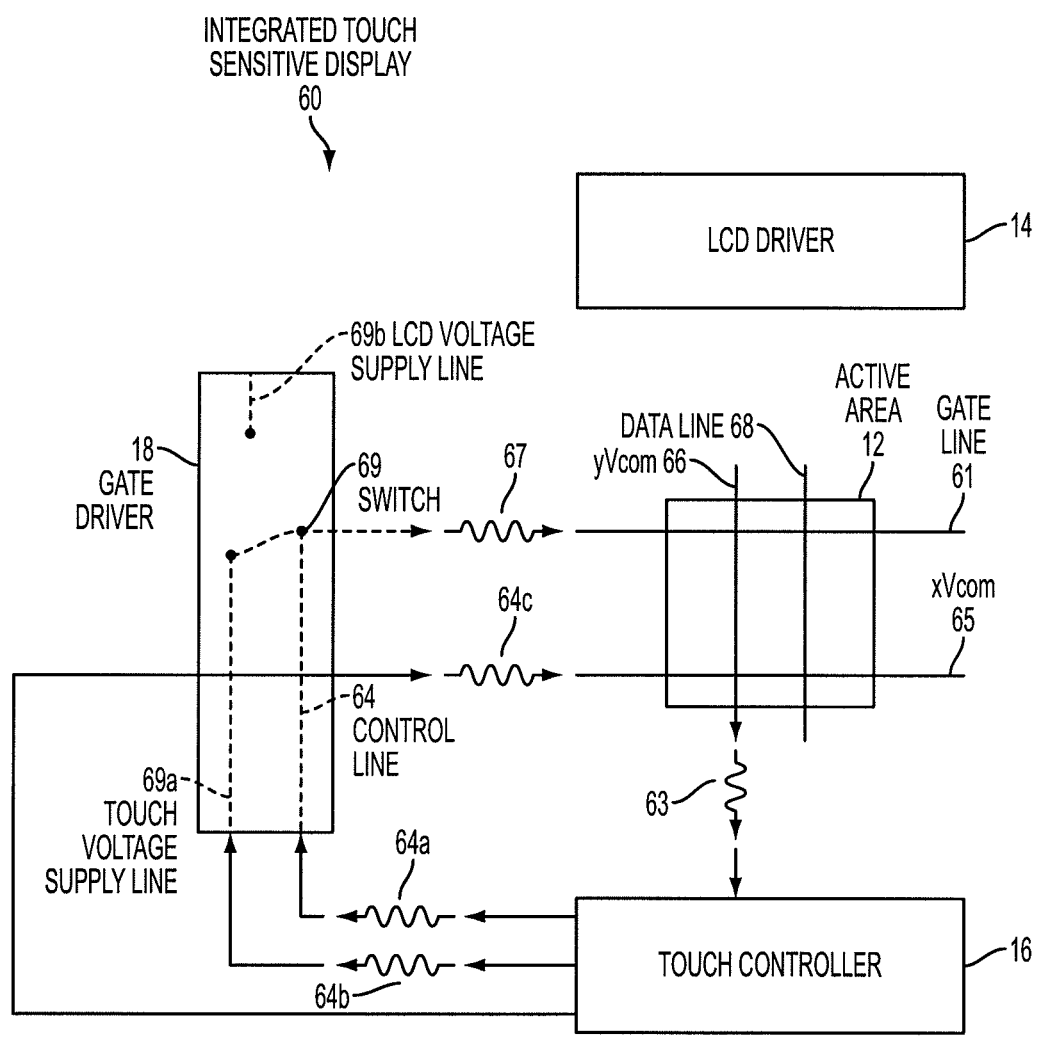
FIG. 6 illustrates an exemplary operation of an integrated touch sensitive display during a touch mode, in which circuit elements of the display can operate to sense a touch on the display.

FIG. 6 illustrates an exemplary operation of an integrated touch sensitive display during a touch mode, in which circuit elements of the display can operate to sense a touch or near touch on the display. In the example of FIG. 6, operation during the touch mode can include actively configuring the display 60 into a touch configuration by, for example, electrically connecting gate driver 18 via switch 69 to touch voltage supply line 69a, which can electrically disconnect gate driver 18 via the switch 69 from LCD voltage supply line 69b. In some embodiments, the LCD driver 14 can electrically disconnect from data line 68. The gate driver 18 can transmit a gate line signal 67 to gate line 61 of the active area 12 to activate the gate line. The touch controller 16 can transmit a stimulation signal 64c to xVcom line 65 (or drive line) to drive touch pixels of the active area 12 to sense a touch. The touch controller 16 can also transmit a touch voltage signal 64b to the gate driver 18 for transmitting to the gate line 61 and a control signal 64a to the gate driver along control line 64 to the switch 69 to cause the switch to connect to the touch voltage supply line 69a. The touch controller 16 can receive a sense signal 63 from yVcom line 66 (or sense line) that senses the touch or near touch on the display 60.

For simplicity, only a single set of lines are shown in the active area in FIGS. 5 and 6. However, it is to be understood that the circuitry can include multiple set of lines corresponding to multiple pixels with signals going to each set as described above during the display mode and the touch mode.

Because the active area can be used for both display and touch, switchable circuitry for both can be implemented. FIGS. 7 through 12 illustrate exemplary gate drivers switchable between display and touch modes. For simplicity, some standard integrated touch sensitive display circuitry has been omitted. Although gate driver circuitry is shown for only one of the display's gate lines, each gate line can have similar circuitry as part of the gate driver. It is to be understood that the omitted circuitry can be included in the display according to various embodiments.

Figure 7:
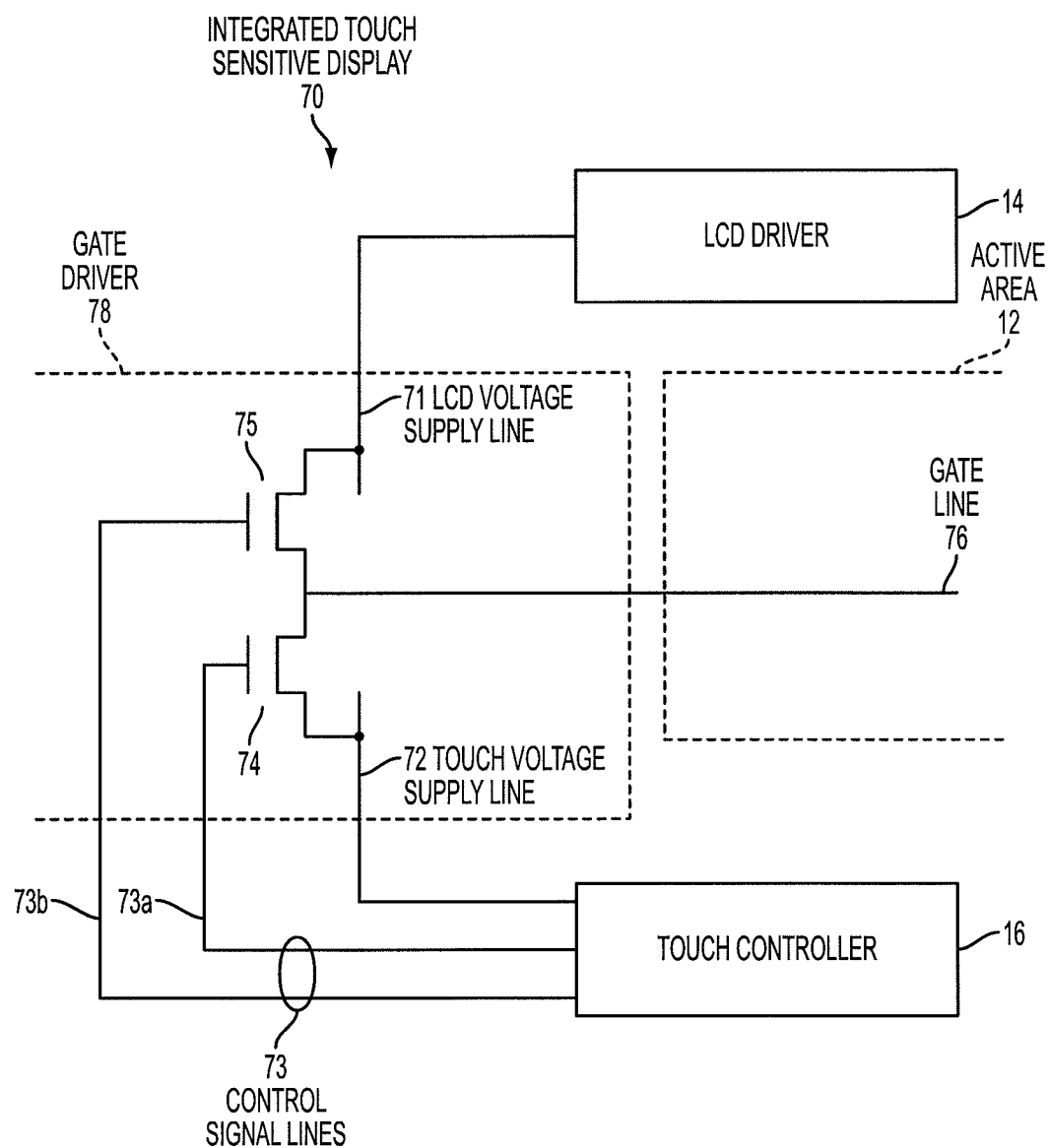
FIG. 7 illustrates an exemplary gate driver that can switch between voltage supplies to gate lines in an active display/touch area of an integrated touch sensitive display for display and touch modes according to various embodiments.

FIG. 7 illustrates an exemplary gate driver that can switch between voltage supplies to gate lines in an active display/touch area of an integrated touch sensitive display for display and touch modes according to various embodiments. In the example of FIG. 7, gate driver 78 of integrated touch sensitive display 70 can include a pair of n-type metal-oxide-semiconductor (NMOS) transistors 74 and 75 to switch between voltage supplies to gate line 76, although it should be understood that other types of transistor switches can be used. Transistor 74 can have connections to its gate, source, and drain that can include a connection to control signal line 73a from touch controller 16, a connection to touch voltage supply line 72 from the touch controller, and a connection to the gate line 76 of active area 12 of the display 70. Transistor 75 can have connections to its gate, source, and drain that can include a connection to control signal line 73b from the touch controller 16, a connection to LCD voltage supply line 71 from LCD driver 14, and a connection to the gate line 76. The other gate lines (not shown) in the active area 12 can have gate driver circuitry that is the same or similar to that shown here for the gate line 76.

During operation, in display mode, the touch controller 16 can output a high control signal along the signal line 73b to activate the transistor 75 to pass an LCD voltage from the supply line 71 to the gate line 76. The voltage to the gate line 76 can be a high voltage, e.g., about +5V in some embodiments, to cause the corresponding display pixels in the active area 12 to refresh to display new image and/or graphics data. The control signal on signal line 73a can be low or off so that the transistor 74 can be switched off to avoid transmitting voltage from the touch controller 16 to the gate line 76.

During the touch mode, the touch controller 16 can output a high control signal along the signal line 73a to activate the transistor 74 to pass a touch voltage from the supply line 72 to the gate line 76. The voltage on the gate line 76 can be a low voltage, e.g., about −5V in some embodiments, to keep the corresponding display pixels in the active area 12 from refreshing and/or interfering with the touch circuitry. The control signal on signal line 73b can be low or off so that the transistor 75 can be switched off to avoid transmitting undesirable fluctuating low voltage, e.g., about −5V in some embodiments, from the LCD driver 14 to the gate line 76.

In this example, transistors are used for the switching. Other switches, e.g., multiplexers, logic gates, latches, etc., can also be used.

Figure 8:
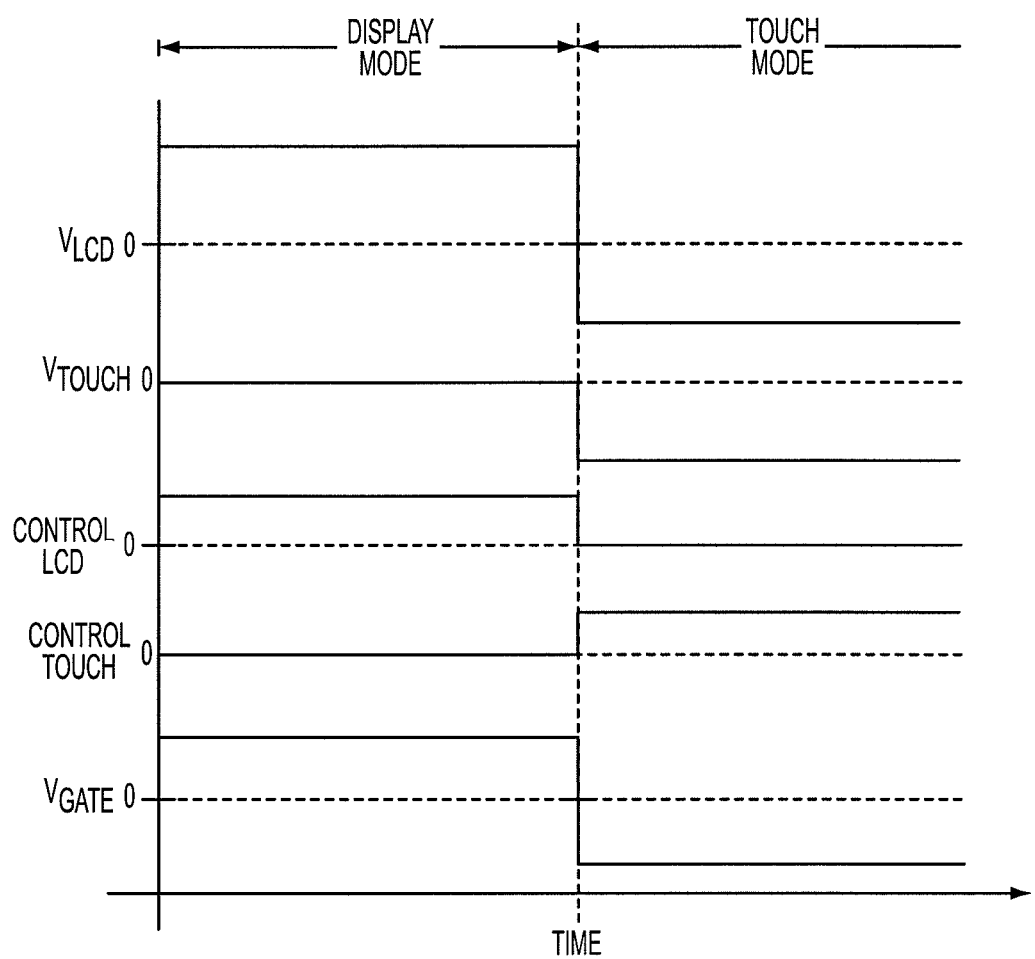
FIG. 8 illustrates an exemplary timing diagram of circuit elements of a gate driver of an integrated touch sensitive display during display and touch modes according to various embodiments.

FIG. 8 illustrates an exemplary timing diagram of circuit elements of the gate driver of FIG. 7 during display and touch modes according to various embodiments. In the example of FIG. 8, during display mode, the LCD driver can output a high voltage ($V_{LCD}$) to the gate driver that can be connected via the gate driver to the active area gate lines so that the corresponding active area display pixels can display images and/or graphics. The touch controller can output either low or no voltage ($V_{touch}$) to the gate driver. The touch controller can output a high control signal ($control_{LCD}$) to the gate driver for the LCD voltage transistor and a low or no control signal ($control_{touch}$) to the gate driver for the touch voltage transistor, resulting in the gate line voltage ($V_{gate}$) being $V_{LCD}$.

During touch mode, the LCD driver can output a low voltage ($V_{LCD}$) to the gate driver. The touch controller can also output a low voltage ($V_{touch}$) to the gate driver that can be connected via the gate driver to the active area gate lines to maintain (or not refresh) the present images and/or graphics on the display while sensing touch and to provide a more stable gate line voltage that cannot interfere appreciably with the touch circuitry while sensing touch. The touch controller can output a low or no control signal ($control_{LCD}$) to the gate driver for the LCD voltage transistor and a high control signal ($control_{touch}$) to the gate driver for the touch voltage transistor, resulting in the gate line voltage ($V_{gate}$) being $V_{touch}$.

The LCD voltage $V_{LCD}$ can fluctuate during both display and touch modes. However, during display mode, because fluctuations in the gate line voltage can be tolerated by the display pixels and because the touch circuitry can be idle or ignored, switching during the display mode to a more stable gate line voltage can be omitted or at least optional.

Figure 9:
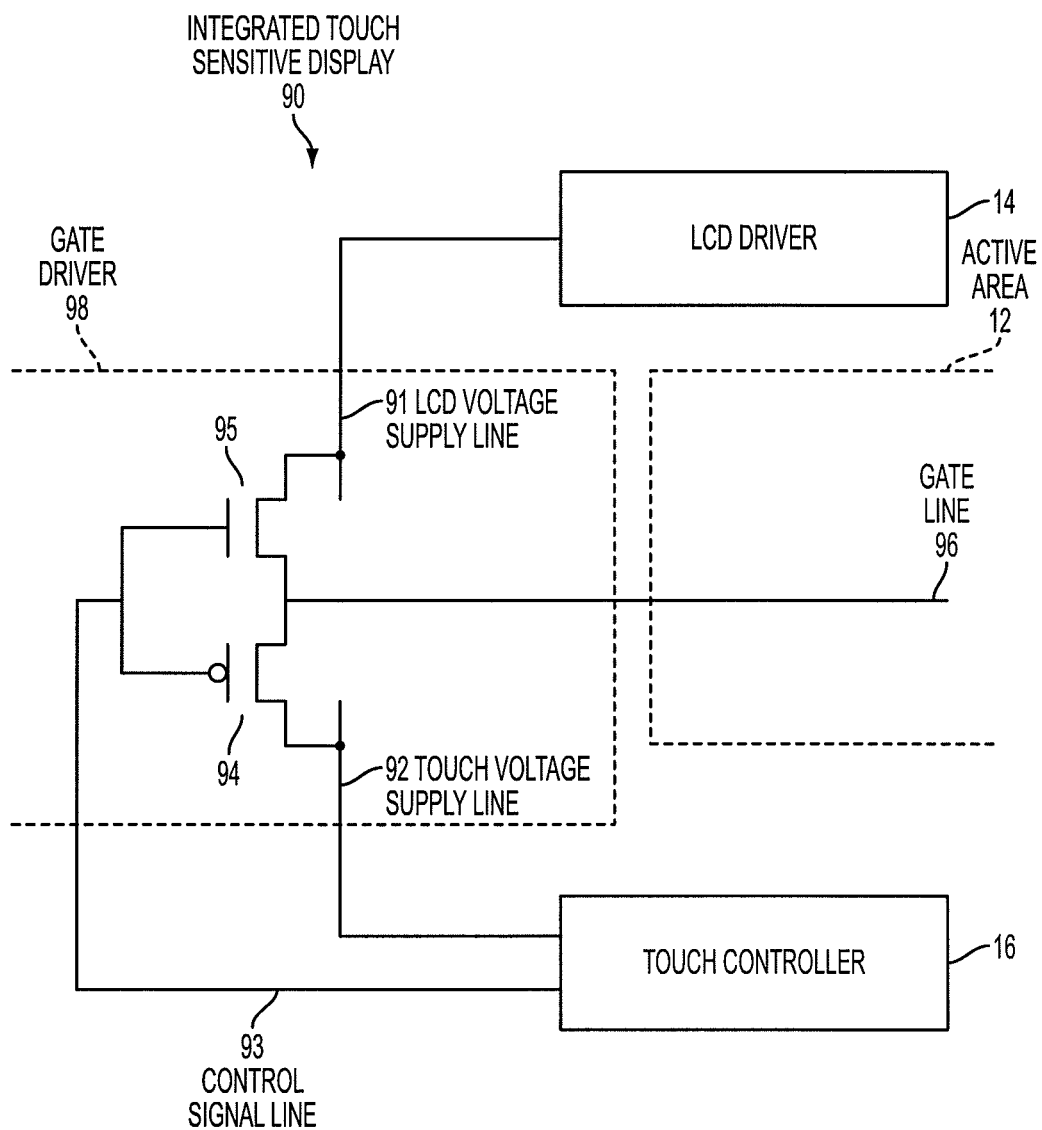
FIG. 9 illustrates another exemplary gate driver that can switch between voltage supplies to gate lines in an active display/touch area of an integrated touch sensitive display for display and touch modes according to various embodiments.

FIG. 9 illustrates another exemplary gate driver that can switch between voltage supplies to gate lines in an active display/touch area of an integrated touch sensitive display for display and touch modes according to various embodiments. In the example of FIG. 9, gate driver 98 of integrated touch sensitive display 90 can include a pair of complementary metal-oxide-semiconductor (CMOS) transistors 94 and 95 to switch between voltage supplies to gate line 96, although it should be understood that other types of transistor switches can be used. Transistor 94 can have connections to its gate, source, and drain that can include a connection to control signal line 93 from touch controller 16, a connection to touch voltage supply line 92 from the touch controller, and a connection to the gate line 96 of active area 12 of the display 90. Transistor 95 can have connections to its gate, source, and drain that can include a connection to the control signal line 93 from the touch controller 16, a connection to LCD voltage supply line 91 from LCD driver 14, and a connection to the gate line 96. The other gate lines (not shown) in the active area 12 can have gate driver circuitry that is the same or similar to that shown here for the gate line 96.

During operation, in display mode, the touch controller 16 can output a high control signal along the signal line 93 to activate the transistor 95 to pass an LCD voltage from the supply line 91 to the gate line 96. The voltage to the gate line 96 can be a high voltage, e.g., about +5V in some embodiments, to cause the corresponding display pixels in the active area 12 to refresh to display image and/or graphics data. The control signal along the signal line 93 can concurrently go to the transistor 94, where it can be inverted to a low signal so as not to activate the transistor 94 so that the transistor can be switched off to avoid transmitting voltage from the touch controller 16 to the gate line 96.

During the touch mode, the touch controller 16 can output a low control signal along the signal line 93 to the transistor 94, where it can be inverted into a high signal, to activate the transistor 94 to pass a touch voltage from the supply line 92 to the gate line 96. The voltage on the gate line 96 can be a low voltage, e.g., about −5V in some embodiments, to keep the corresponding display pixels in the active area 12 from refreshing and/or interfering with the touch circuitry. The control signal along the signal line 93 can concurrently connect to the transistor 95 so that the transistor can be switched off to avoid transmitting undesirable fluctuating low voltage from the LCD driver 14 to the gate line 96.

In this example, transistors are used for the switching. Other switches, e.g., multiplexers, logic gates, latches, etc., can also be used.

Figure 10:
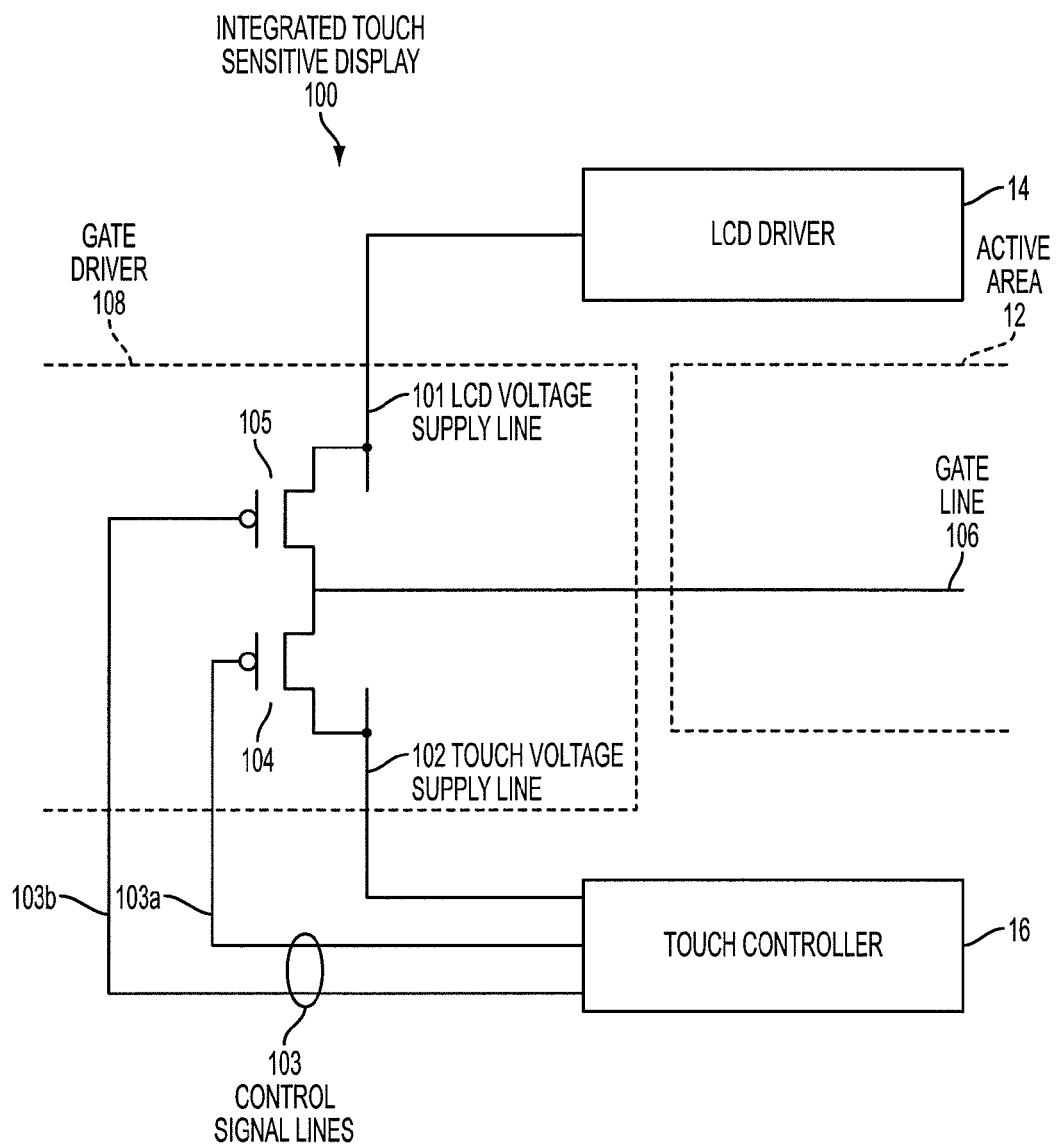
FIG. 10 illustrates still another exemplary gate driver that can switch between voltage supplies to gate lines in an active display/touch area of an integrated touch sensitive display for display and touch modes according to various embodiments.

FIG. 10 illustrates still another exemplary gate driver that can switch between voltage supplies to gate lines in an active display/touch area of an integrated touch sensitive display for display and touch modes according to various embodiments. In the example of FIG. 10, gate driver 108 of integrated touch sensitive display 100 can include a pair of p-type metal-oxide-semiconductor (PMOS) transistors 104 and 105 to switch between voltage supplies to gate line 106, although it should be understood that other types of transistor switches can be used. Transistor 104 can have connections to its gate, source, and drain that can include a connection to control signal line 103a from touch controller 16, a connection to touch voltage supply line 102 from the touch controller, and a connection to the gate line 106 of active area 12 of the display 100. Transistor 105 can have connections to its gate, source, and drain that can include a connection to control signal line 103b from the touch controller 16, a connection to LCD voltage supply line 101 from LCD driver 14, and a connection to the gate line 106. The other gate lines (not shown) in the active area 12 can have gate driver circuitry that is the same or similar to that shown here for the gate line 106.

During operation, in display mode, the touch controller 16 can output a low control signal along the signal line 103b to the transistor 105, where it can be inverted to a high signal, to activate the transistor 105 to pass an LCD voltage from the supply line 101 to the gate line 106. The voltage to the gate line 106 can be a high voltage, e.g., about +5V in some embodiments, to cause the corresponding display pixels in the active area 12 to refresh to display new image and/or graphics data. The control signal on the signal line 103a can be high and inverted to a low signal at the transistor 104 so that the transistor can be switched off to avoid transmitting voltage from the touch controller 16 to the gate line 106.

During the touch mode, the touch controller 16 can output a low control signal along the signal line 103a to the transistor 104, where it can be inverted to a high signal, to activate the transistor to pass a touch voltage from the supply line 102 to the gate line 106. The voltage on the gate line 106 can be a low voltage, e.g., about −5V in some embodiments, to keep the corresponding display pixels in the active area 12 from refreshing and/or interfering with the touch circuitry. The control signal on the signal line 103b can be high and inverted to a low signal at the transistor 105 so that the transistor can be switched off to avoid transmitting undesirable fluctuating low voltage from the LCD driver 14 to the gate line 106.

In this example, transistors are used for the switching. Other switches, e.g., multiplexers, logic gates, latches, etc., can also be used.

Figure 11:
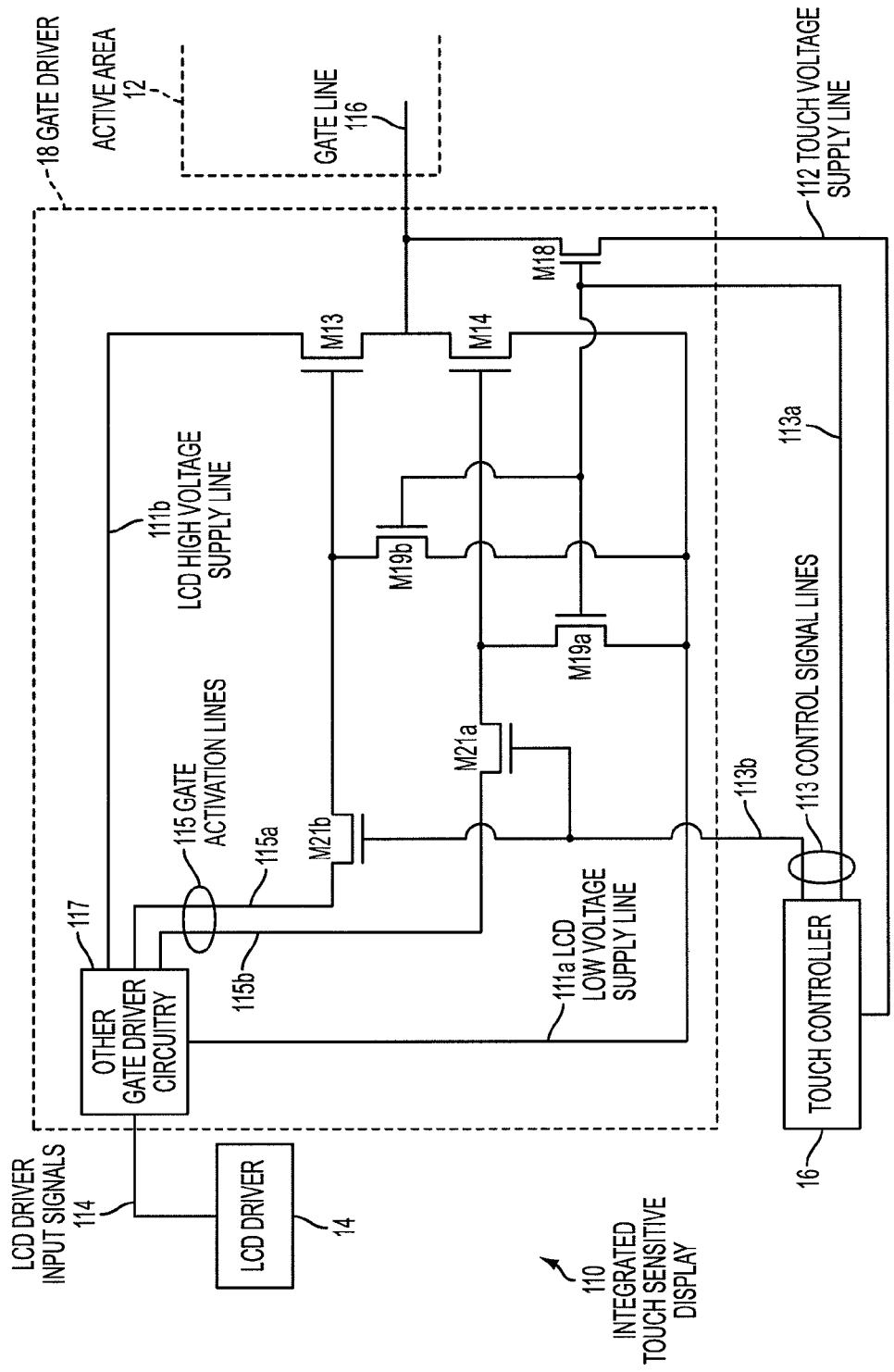
FIG. 11 illustrates yet another exemplary gate driver that can switch between voltage supplies to gate lines in an active display/touch area of an integrated touch sensitive display for display and touch modes according to various embodiments.

FIG. 11 illustrates yet another exemplary gate driver that can switch between voltage supplies to gate lines in an active display/touch area of an integrated touch sensitive display for display and touch modes according to various embodiments. In the example of FIG. 11, gate driver 18 of integrated touch sensitive display 110 can include NMOS transistors M13, M14, M18, M19a, M19b, M21a, and M21b to switch between voltage supplies to gate line 116, although it should be understood that other types of transistor switches can be used. Transistor M13 can have connections to its gate, source, and drain that can include a connection to LCD high voltage supply line 111b, a connection to transistors M19b and M21b, and a connection to gate line 116. Transistor M14 can have connections to its gate, source, and drain that can include a connection to transistors M19a and M21a, a connection to LCD low voltage supply line 111a, and a connection to gate line 116. Transistor M18 can have connections to its gate, source, and drain that can include a connection to a control signal line 113a from touch controller 16, a connection to touch voltage supply line 112 from the touch controller, and a connection to the gate line 116. Transistor M19a can have connections to its gate, source, and drain that can include a connection to the control signal line 113a from the touch controller 16, a connection to the LCD low voltage supply line 111a, and a connection to a line connecting transistors M14 and M21a. Transistor M19b can have connections to its gate, source, and drain that can include a connection to the control signal line 113a from the touch controller 16, a connection to the LCD low voltage supply line 111a, and a connection to a line connecting transistors M13 and M21b. Transistor M21a can have connections to its gate, source, and drain that can include a connection to control signal line 113b from the touch controller 16, a connection to transistors M14 and M19a, and a connection via gate activation line 115b to the other gate driver circuitry 117. Transistor M21b can have connections to its gate, source, and drain that can include a connection to the control signal line 113b from the touch controller 16, a connection to transistors M13 and M19b, and a connection via gate activation line 115a to the other gate driver circuitry 117. The other gate lines (not shown) in the active area 12 can have gate driver circuitry that is the same or similar to that shown here for the gate line 116.

The LCD driver 14 can connect to the gate driver 18 through the other gate driver circuitry 117 and provide input signals to the gate driver via LCD driver input signal lines 114. Example input signals that the LCD driver 14 can provide include the LCD voltage, a clock signal, a scan signal, etc., which can drive the gate driver 18 and other display circuitry for displaying image and/or graphics data on display pixels in the active area 12 of the display. In this example, the LCD voltage signal is shown, but other input signals can also be used by the gate driver for switching according to various embodiments.

During operation, in display mode, gate activation signals on gate activation lines 115 from the other gate driver circuitry 117 can activate the transistor M13 to pass an LCD high voltage from the supply line 111b to the gate line 116 or the transistor M14 to pass an LCD low voltage from the supply line 111a to the gate line 116. The touch controller 16 can output a high control signal along the signal line 113b to activate the transistors M21a and M21b to send the gate activation signals to transistors M13 and M14 to pass an LCD voltage and/or other LCD signals from the supply line 111a or the supply line 111b to the gate line 116. The gate activation signal lines 115a and 115b can transmit gate activation signals that can be inverses of each other, such that, when a high activation signal is transmitted on signal line 115a to the transistor M13 to pass an LCD high voltage, the inverse low activation signal can be transmitted on signal line 115b to the transistor M14 to switch it off so as not to pass an LCD low voltage at the same time, and vice versa. The voltage to the gate line 116 can range from a low voltage to a high voltage, e.g., about −5V to +5V in some embodiments, to cause the corresponding display pixels in the active area 12 to refresh to display new image and/or graphics data. The control signal on signal line 113a can be low or off so that the transistor M18 can be switched off to avoid transmitting voltage from the touch controller 16 to the gate line 116 and the transistors M19a and M19b can be switched off to avoid blocking the LCD voltage and/or other LCD signals.

During the touch mode, the touch controller 16 can output a high control signal along the signal line 113a to activate the transistor M18 to pass a touch voltage from the supply line 112 to the gate line 116. The voltage on the gate line 116 can be a low voltage, e.g., about −5V in some embodiments, to keep the corresponding display pixels in the active area 12 from refreshing and/or interfering with the touch circuitry. The control signal along the signal line 113a can also activate the transistors M19a and M19b to block undesirable fluctuating voltage from the LCD driver 14 to the gate line 116. Transistor M19b can block the transistor M13 from affecting the gate line voltage. For example, the transistor M19b can ensure that the transistor M13 is turned off, causing the output (and in some cases the input) of the transistor M13 to float. Similarly, transistor M19a can block the transistor M14 from affecting the gate line voltage. For example, the transistor M19a can ensure that the transistor M14 is turned off, causing the output (and in some cases the input) of the transistor M14 to float. The control signal on signal line 113b can be low or off so that the transistors M21a and M21b can be switched off, which in turn can switch transistors M13 and M14 off, to avoid transmitting undesirable fluctuating voltage from the LCD driver 14 to the gate line 116. The output from the transistor M18 can replace the floating output of the transistors M13 and/or M14 in this example.

In this example, transistors are used for the switching. Other switches, e.g., multiplexers, logic gates, latches, etc., can also be used.

In some embodiments, the touch voltage supply line 112 can be made thicker and/or longer according to various embodiments. This can advantageously reduce the likelihood of the touch voltage supply line having high impedance that would interfere with the operation of the display during touch mode.

Figure 12:
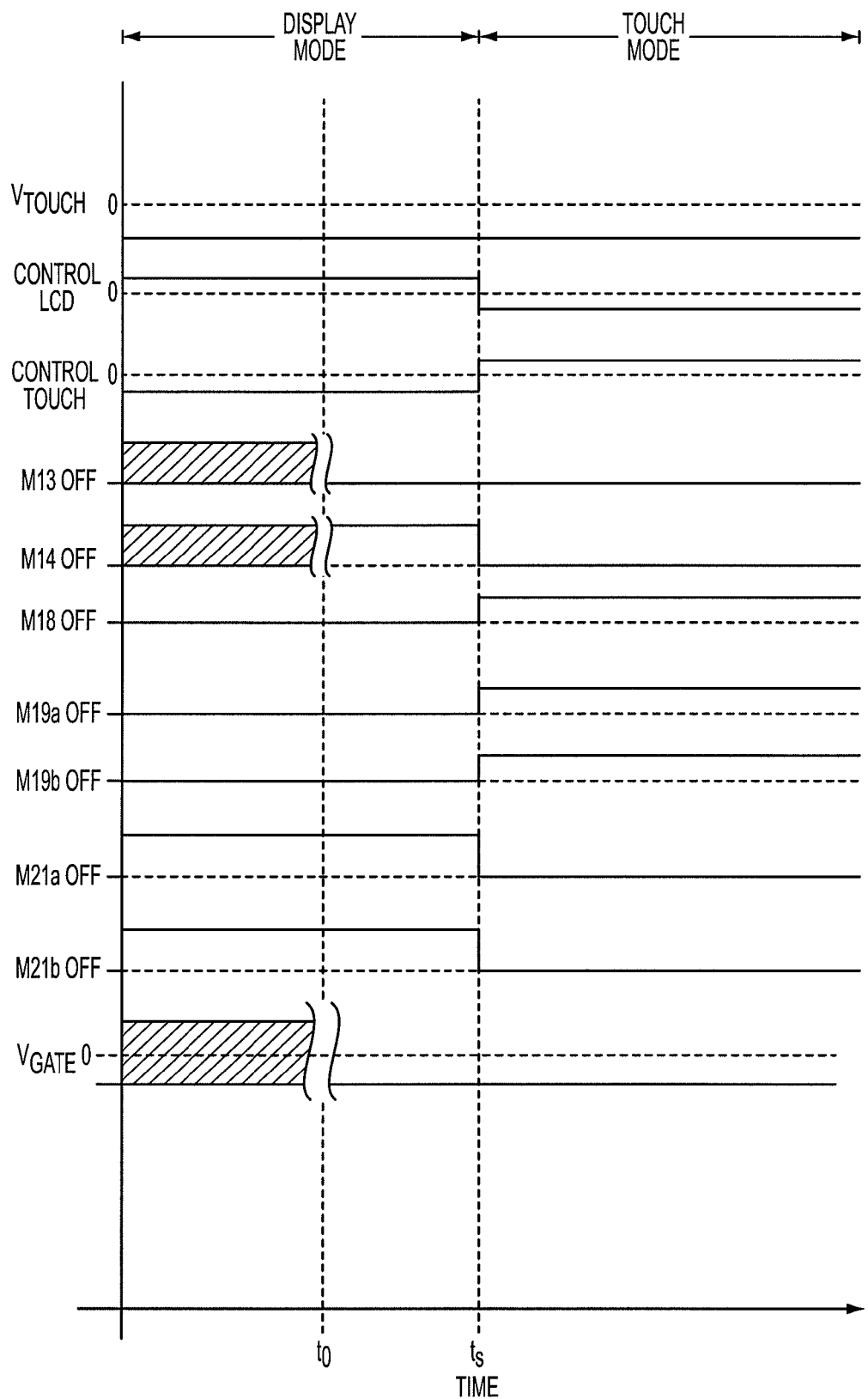
FIG. 12 illustrates an exemplary timing diagram of circuit elements of a gate driver of an integrated touch sensitive display during display and touch modes according to various embodiments.

FIG. 12 illustrates an exemplary timing diagram of circuit elements of the gate driver of FIG. 11 during display and touch modes according to various embodiments. In the example of FIG. 12, during display mode, the LCD driver can output a high voltage that can be connected via the gate driver to the active area gate lines so that the corresponding active area display pixels can display images and/or graphics. The gate driver can activate the transistor M13 so that the gate line voltage ($V_{gate}$) can be high. The LCD driver can also output a low voltage that can be connected via the gate driver to the active area gate lines so that the corresponding active area display pixels can display images and/or graphics. The gate driver can activate the transistor M14 so that the gate line voltage $V_{gate}$ can be low. As such, either transistor M13 can be on with transistor M14 off or vice versa. As such, the gate line voltage can range from high to zero to low during the display mode. For example, as illustrated here, transistors M13 and M14 can be either on or off. At time $t_o$, transistor M14 can be switched on and transistor M13 can be switched off such that the gate line voltage can be the LCD low voltage passed by transistor M14 until time $t_s$, then the display can switch from display mode to touch mode. The touch controller can output either low or no voltage ($V_{touch}$) to the gate driver. The touch controller can output a high control signal (control$_{LCD}$) to the gate driver, which can activate the transistors M21a and M21b, which can in turn output inverse gate activation signals that can activate either M13 or M14 so that the gate line voltage $V_{gate}$ can be either high or low. The touch controller can output a low or no control signal (control$_{touch}$) to the gate driver, so as not to activate the transistors M18, M19a, and M19b so that the touch voltage cannot be transmitted to the gate line and the LCD voltage cannot be blocked from transmitting to the gate lines.

During touch mode, the LCD driver can output a low voltage to the gate driver. The touch controller can also output a low voltage ($V_{touch}$) to the gate driver that can be connected via the gate driver to the active area gate lines to maintain (or not refresh) the present images and/or graphics on the display while sensing touch and to provide a more stable gate line voltage that cannot interfere appreciably with the touch circuitry while sensing touch. The touch controller can output a high control signal (control$_{touch}$) to the gate driver, which can activate the transistor M18 so that the gate line voltage ($V_{gate}$) can be $V_{touch}$. The control signal control$_{touch}$ can also activate the transistors M19a and M19b, which can block gate activation signals to the transistors M13 and M14 to ensure the transistors M13 and M14 can be switched off so as not to transmit the LCD voltage. The touch controller can output a low or no control signal (control$_{LCD}$) to the gate driver, so as not to activate the transistors M21a and M21b to output gate activation signals to the transistors M13 and M14, so that the LCD voltage cannot be transmitted to the gate lines.

As mentioned previously, the LCD voltage $V_{LCD}$ can fluctuate during both display and touch modes, but switching during the display mode to a more stable gate line voltage can be omitted or at least optional.

The transistors are not limited to the NMOS, CMOS, and PMOS transistors and configurations shown here, but can include these and any other types of transistors individually or in combination in any configuration capable of operating according to various embodiments.

Figure 13:
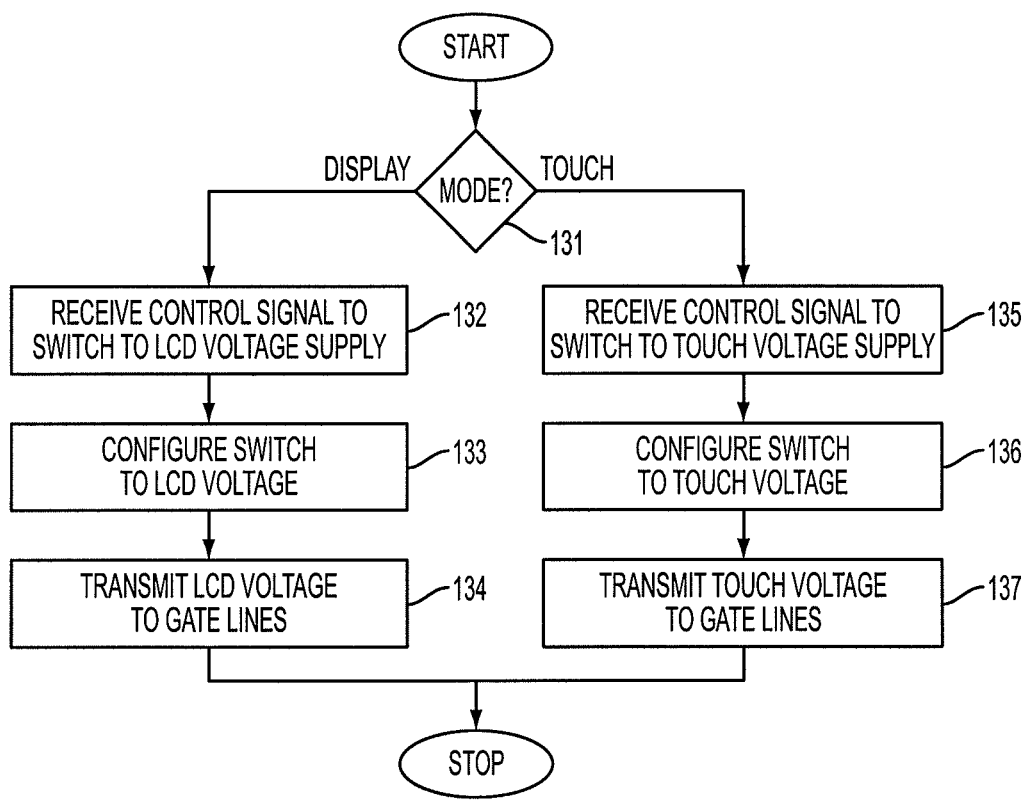
FIG. 13 illustrates an exemplary method for switching gate driver circuitry of an integrated touch sensitive display between display and touch modes according to various embodiments.

FIG. 13 illustrates an exemplary method for switching gate driver circuitry of an integrated touch sensitive display between display and touch modes according to various embodiments. In the example of FIG. 13, a determination can be made whether the integrated touch sensitive display is in display mode or touch mode (131). The mode can be determined, for example, based on a user input, a device input, an algorithm input, etc., which can either select or indicate the mode.

If the display is determined to be in display mode, the gate driver can receive a control signal to switch the connections between the gate driver and the gate lines in the active area of the display so that the gate driver can transmit voltage from the LCD driver to the gate lines (132). One or more switches, such as shown in the preceding figures herein, can be configured to connect the LCD voltage supply line to the active area gate lines (133). The gate driver can transmit the LCD voltage to the gate lines via the connections (134).

If the display is determined to be in touch mode, the gate driver can receive a control signal to switch the connections between the gate driver and the active area gate lines so that the gate driver can transmit voltage from the touch controller to the gate lines (135). One or more switches, such as shown herein, can be configured to connect the touch voltage supply line to the active area gate lines (136). The gate drive can transmit the touch voltage to the gate lines via the connections (137).

In another method, the switching can be based on the degree of fluctuation in the LCD voltage rather than on the mode. For example, if the LCD voltage fluctuates beyond a particular range, e.g., more than about 1V, then the gate driver can receive a control signal to switch the connections between the gate driver and the gate lines from the fluctuating LCD voltage to a more stable touch voltage.

In another method, the switching can be based on the amount of noise in the LCD voltage rather than on the mode. For example, if the LCD voltage includes noise above a particular threshold, then the gate driver can receive a control signal to switch the connections between the gate driver and the gate lines from the noisy LCD voltage to a cleaner touch voltage.

In another method, the switching can be based on the amount of parasitic capacitance measured in the touch circuitry rather than on the mode. For example, if the capacitance in the touch circuitry exceeds a particular level using the LCD voltage, then the gate driver can receive a control signal to switch the connections between the gate driver and the gate lines from the LCD voltage to a voltage, e.g., a touch voltage, that can reduce the capacitance.

In another method, the switching can be based on the strength and/or presence of the LCD voltage rather than on the mode. For example, if the LCD voltage fades or turns off, then the gate driver can receive a control signal to switch the connections between the gate driver and the gate lines from the LCD voltage supply to a stronger and/or turned-on touch voltage supply.

It is to be understood that additional or other actions to those of FIG. 13 can be performed according to various embodiments. It is further to be understood that the switching is not limited to switching from LCD voltage to touch voltage, but can include the reverse—switching from touch voltage to LCD voltage under similar conditions—and/or switching between the LCD voltage, the touch voltage, and other voltage supplies available to the display.

Figure 14:
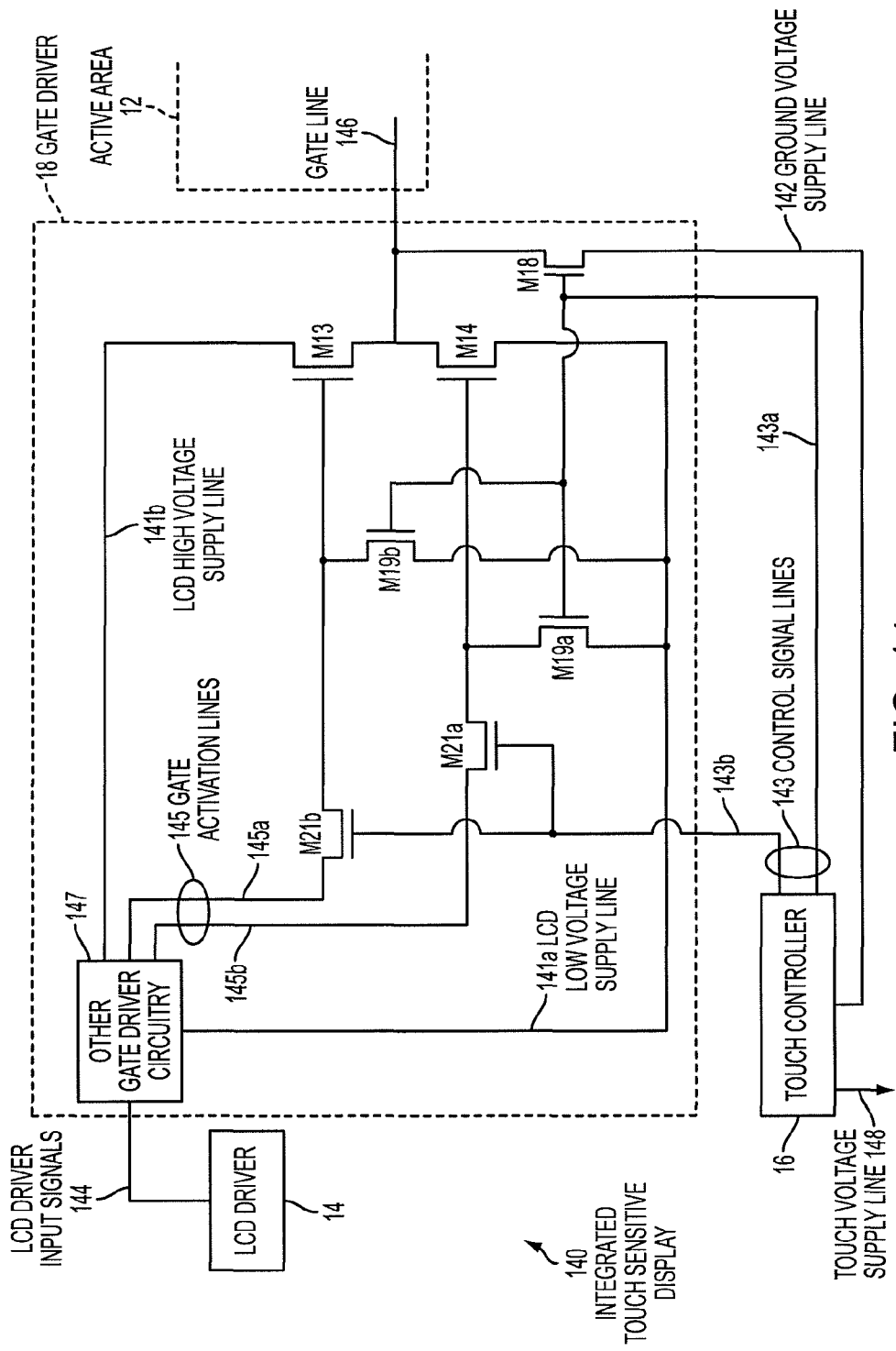
FIG. 14 illustrates another exemplary gate driver that can switch between voltage supplies to gate lines in an active display/touch area of an integrated touch sensitive display for display and touch modes according to various embodiments.

FIG. 14 illustrates another exemplary gate driver that can switch between voltage supplies to gate lines in an active display/touch area of an integrated touch sensitive display for display and touch modes according to various embodiments. The gate driver of FIG. 14 can be similar to the gate driver of FIG. 11 with the following difference. Rather than transistor M18 receiving a touch voltage from the touch controller via touch voltage supply line 112 as in FIG. 11, transistor M18 can receive a ground voltage from the touch controller via ground voltage supply line 142 of FIG. 14. The ground voltage supply can be split between multiple supply lines. For example, each display row of active display/touch area 12 can have an individual ground voltage supply line 142 to couple to an individual gate line 146. In some embodiments, the number of ground voltage supply lines 142 can be the same as the number of xVcom lines (e.g., line 55 of FIG. 5). In some embodiments, one or more ground voltage supply lines can share display rows according to the needs of the device. In operation during touch mode, gate line 146 can receive a voltage from touch circuitry ground. The ground can be an active ground to supply voltage along the ground voltage supply line 142 and a negative resistance can be provided on the touch voltage supply line 148.

During operation, in the display mode, the control signal on signal line 143a can be low or off so that the transistor M18 can be switched off or inactive to avoid transmitting ground voltage from the touch controller 16 to the gate line 146. During the touch mode, the control signal on the signal line 143a can be high or on to activate the transistor M18 to pass a ground voltage from the ground voltage supply line 142 to the gate line 146. The components of the gate driver of FIG. 14 can operate in a same or similar manner to the gate driver components of FIG. 11, as described previously.

Additionally, the gate driver components of FIG. 14 can have a timing diagram that can be the same or similar to that of FIG. 12, as described previously, where the touch voltage $V_{touch}$ can be the ground voltage from the ground voltage supply line 142 rather than a voltage from the touch voltage supply line 148.

Figure 15:
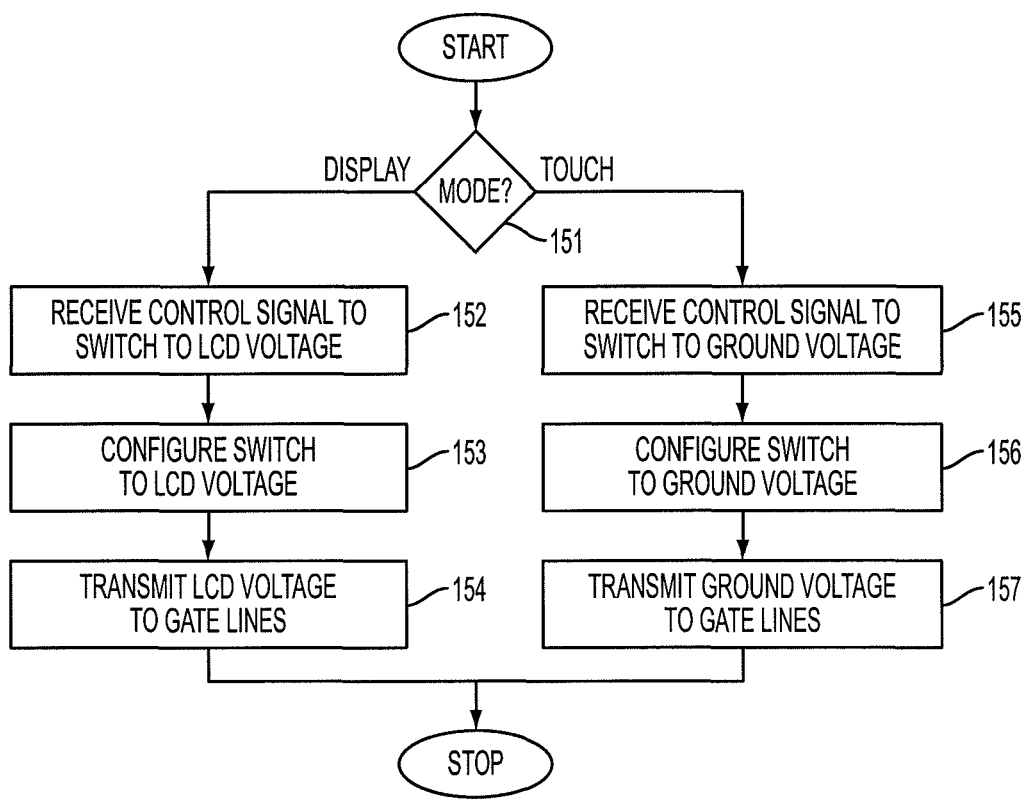
FIG. 15 illustrates another exemplary method for switching gate driver circuitry of an integrated touch sensitive display between display and touch modes according to various embodiments.

FIG. 15 illustrates another exemplary method for switching gate driver circuitry of an integrated touch sensitive display between display and touch modes according to various embodiments. The method of FIG. 15 is similar to the method of FIG. 13 with the following difference. During touch mode, the gate driver can receive a control signal to switch the connections between the gate driver and the active area gate lines so that the gate driver can transmit voltage from the active touch circuitry ground to the gate lines (155). One or more switches, such as shown herein, can be configured to connect the ground voltage supply line to the active area gate lines (156). The gate drive can transmit the ground voltage to the gate lines via the connections (157). During display mode, the gate driver can operate as previously described in FIG. 13.

It is to be understood that additional and/or other actions to those of FIG. 15 can be performed according to various embodiments.

Figure 16:
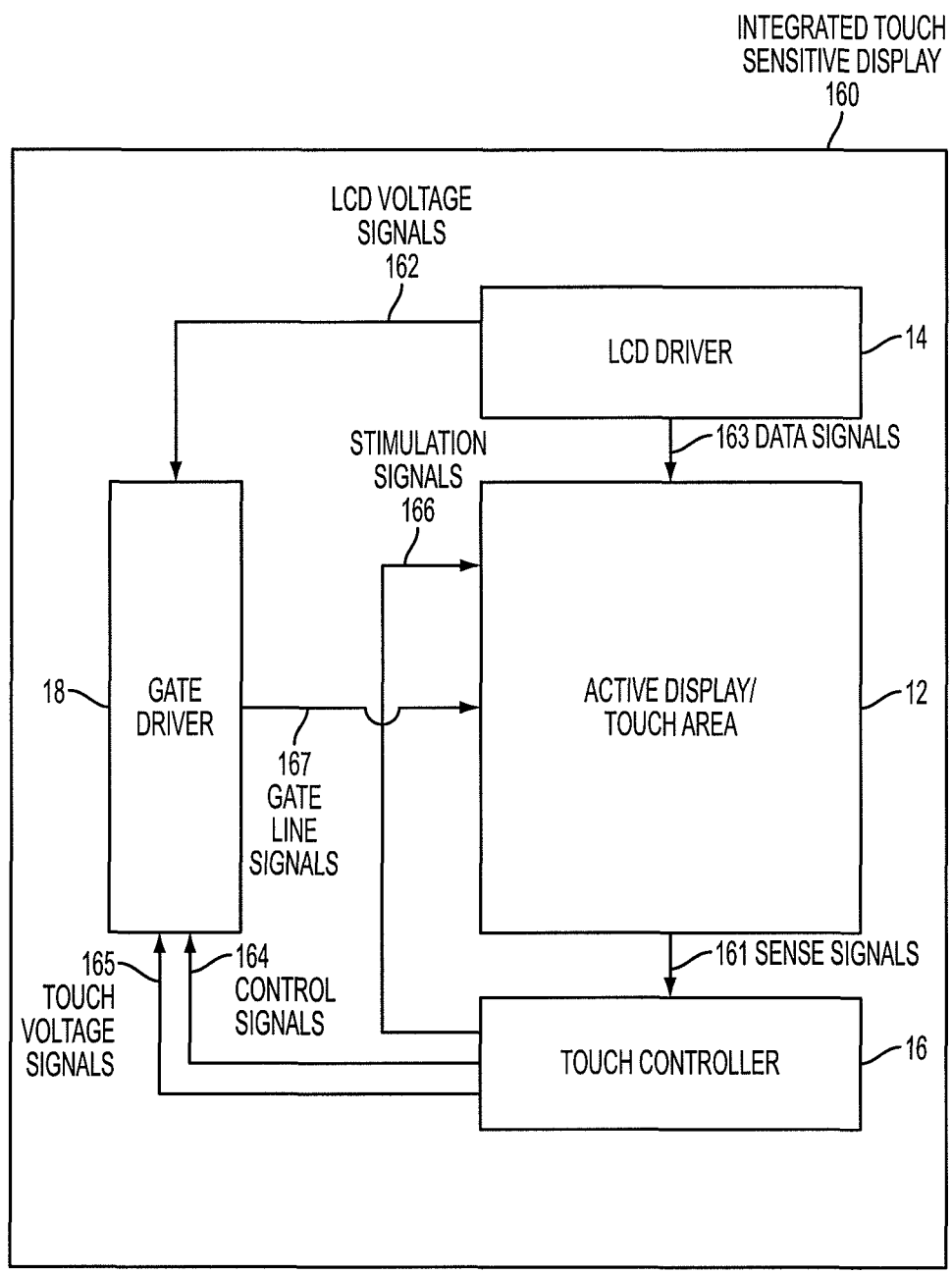
FIG. 16 illustrates an exemplary integrated touch sensitive display with switchable gate driver circuitry distant from an active display/touch area of the display according to various embodiments.

FIG. 16 illustrates an exemplary integrated touch sensitive display with switchable gate driver circuitry distant from an active display/touch area of the display according to various embodiments. The term "distant" can refer to the gate driver circuitry being on the same chip as the active area, but either not immediately adjacent to, not in physical contact with, or separated from the active area, such as having either other circuitry or a small physical space therebetween; or portions or all of the gate driver circuitry being on a separate chip from the active area. The example of FIG. 16 is similar to the example of FIG. 2 except gate driver 18 of FIG. 16 can be distant from active display/touch area 12 with stimulation lines to transmit stimulation signals 166 between the gate driver and the active area. The stimulation lines can provide shielding to further block interference to touch circuitry from any electric fields caused by activity on LCD driver 14 and transmitted to the gate driver 18 during touch mode. In addition to the gate driver circuitry switching between voltage supplies, the stimulation line shielding can reduce interference of the LCD driver on the touch circuitry.

In the example of FIG. 16, integrated touch sensitive display 160 can include active display/touch area 12, which can have integrated display and touch capabilities to display images and/or graphics during display mode and to sense touch or near touch on the display during touch mode. The display 160 can also include LCD driver 14, which can drive data lines of the active area 12 and can cause gate driver 18 to drive gate lines of the active area so that the active area can display image and/or graphics data transmitted on the data lines. The display 160 can include touch controller 16, which can drive the active area 12 to sense touch or near touch on the display and can cause gate driver 18 to drive gate lines of the active area so that the display circuitry does not interfere with the touch circuitry during touch mode. The display 160 can also include gate driver 18, which can drive gate lines of the active area 12. The gate driver 18 can be disposed at a distance from the active area 12.

The LCD driver 14 can output data signals 163 to data lines of the active area 12. The data signals 163 can include image and/or graphics data for displaying on the display pixels in the active area 12 during display mode. The LCD driver 14 can also output LCD voltage signals 162 to the gate driver 18. The voltage signals 162 can supply voltage to the gate driver 18 to drive gate lines of the active area 12 in order to activate display pixels to display image and/or graphics data on the data lines during display mode.

The touch controller 16 can output stimulation signals 166 to drive lines of the active area 12. The stimulation signals 166 can stimulate the drive lines so that the touch pixels in the active area 12 can sense touch or near touch during touch mode. The touch controller 16 can receive sense signals 161 from the active area 12. The sense signals 161 can represent a capacitance generated in response to a touch or near touch at the active area 12. The touch controller 16 can output touch voltage signals 165 to the gate driver 18. The voltage signals 165 can supply voltage to the gate driver 18 to drive gate lines of the active area 12 in order to reduce interference by the display circuitry with the touch circuitry during touch mode. The touch controller 16 (or other display components) can output control signals 164 to the gate driver 18 to select which of the LCD voltage signals 162 or the touch voltage signals 165 to drive the gate lines of the active area 12 based on the display or touch mode.

The gate driver 18 can output gate line signals 167 to the gate lines of the active area 12. The gate driver 18 can switchably output the LCD voltage signals 162 during the display mode and the touch voltage signals 165 during the touch mode. The gate driver 18 can be proximate to the active area 12. In some embodiments, the gate driver can be proximate to either side of the active area. In some embodiments, a second gate driver can be included, such that two gate drivers are proximate to both sides of the active area.

Each stimulation signal 166 can stimulate a corresponding drive line or multiple drive lines. Each gate line signal 167 can drive a corresponding gate line. Each data signal 163 can drive a corresponding data line. Each sense signal 161 can transmit information of a sensed touch or near touch on a corresponding sense line.

In additional to or alternative to reducing interference from the LCD driver during touch mode, the gate driver can switch from the LCD voltage to the touch voltage to reduce noise in the voltage, to reduce parasitic capacitance in the active area, to replace a fading and/or lost voltage signal, and so on. The gate driver can also switch from the touch voltage to the LCD voltage to reduce undesirable effects on the display. The gate driver can further switch to other voltage supplies available to the display.

It is to be understood that an integrated touch sensitive display according to various embodiments is not limited to the components and configuration illustrated in FIG. 16, but can include additional or other components in the same or different configurations capable of performing according to various embodiments.

In some embodiments, a single voltage supply can be used capable of providing multiple operating modes, where a first mode can supply a fluctuating voltage during display mode of an integrated touch sensitive display and a second mode can supply a more stable voltage during touch (or another) mode of the display. For example, the touch controller can output a control signal to the voltage supply to switch to a display mode, which would result in the gate driver transmitting the display mode voltage from the single supply, or to switch to a touch mode, which would result in the gate driver transmitting the touch mode voltage from the single supply. In some embodiments, the gate driver or the LCD driver could output the control signal to the voltage supply.

Figures 1, 17:
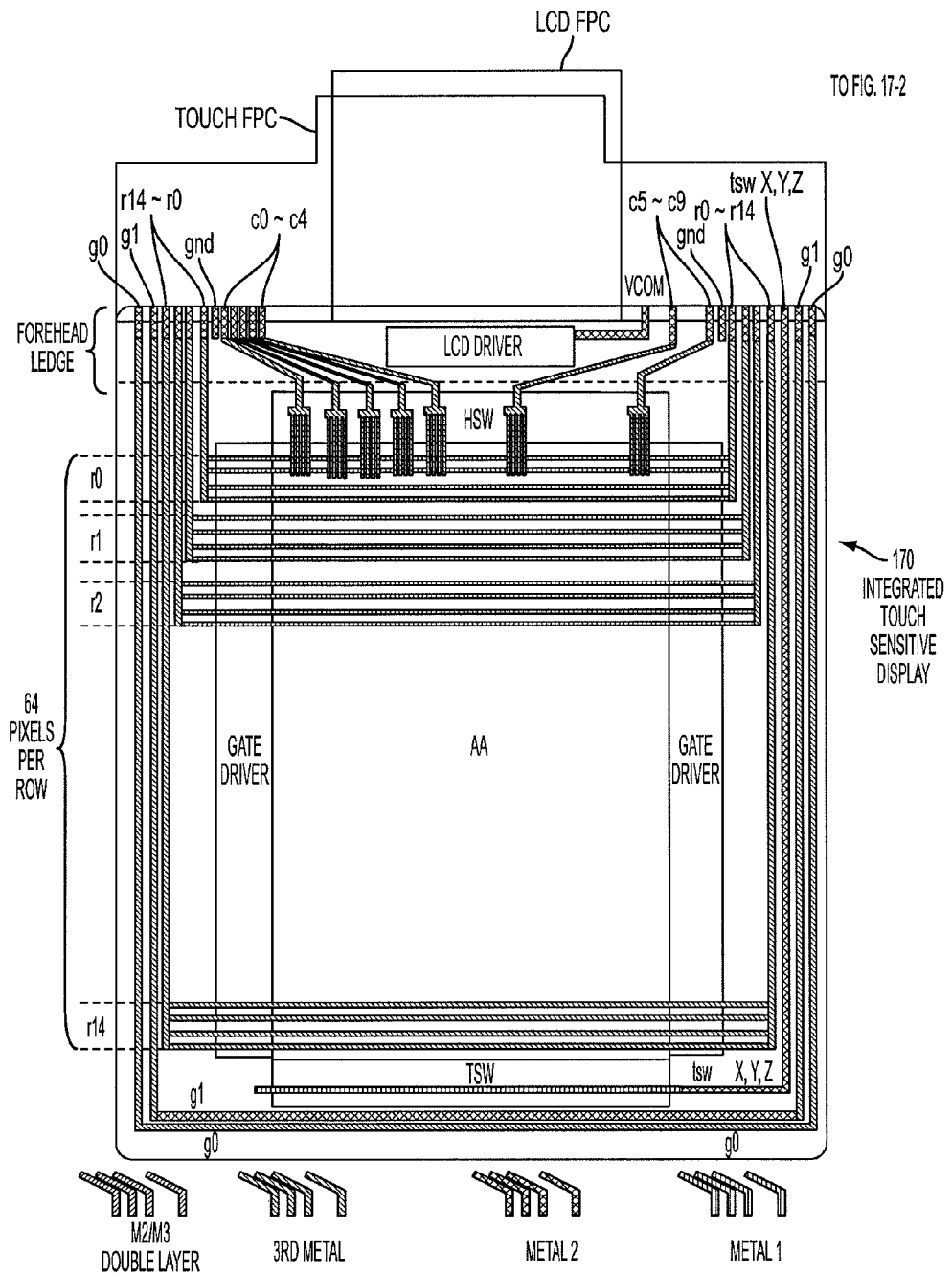
Figures 2, 17:
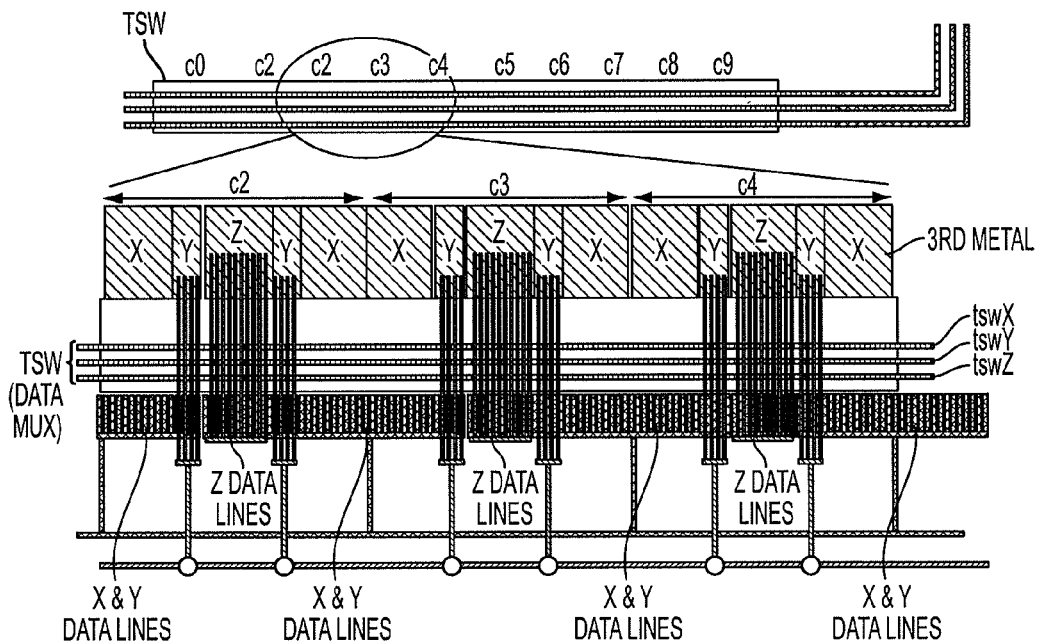

FIGS. 17-1 and 17-2 illustrate an exemplary layout of an integrated touch sensitive display according to various embodiments. In the example of FIG. 17-1, integrated touch sensitive display 170 can include an LCD FPC that can connect the display to LCD circuitry (not shown), an LCD driver that can drive the display pixels in the active display/touch area (AA) in a display mode, and a Vcom line that can carry a common voltage for the display. The Touch FPC can include the following lines: r0-r14 and r14-r0 lines that can transmit stimulation signals to the drive regions, c0-c9 lines that can receive sense signals from the sense regions, and tswX, tswY, and tswZ (illustrated in the figure as "tsw X,Y,Z") lines that can connect to a touch switch (TSW) that can control various switching, such as switching from connecting all data lines to a virtual ground in a touch mode to connecting the respective data lines to corresponding data outputs from the LCD driver during a display mode, switching between sense regions during the touch mode, etc. The Touch FPC can also include g1 and g0 lines for connecting data lines and grounding regions, respectively, to virtual grounds. The Touch FPC can include a hardware switch (HSW) that can control various switching, such as connecting data lines of the AA to corresponding data outputs from the LCD driver during the display mode and disconnecting the data lines during the touch mode, etc. The Touch FPC can also include gate drivers that can drive gate lines of the AA according to various embodiments. In this example, gate drivers are shown on both sides of the AA. It is to be understood that gate drivers can be on either or both sides depending on the needs, application, available surface area, etc., of the display.

FIG. 17-2 also illustrates a side view of the integrated touch sensitive display 170. The side view illustrates some of the connections in more detail. For example, FIG. 17-2 illustrates connections of a $3^{rd}$ metal (M3) from Y regions that can allow those regions to be grounded to g0. M3 connections from Z regions can allow the Z regions to be connected to c0-c9 lines. Connections of a $2^{nd}$ metal (M2) can allow data lines to be grounded to g1 during the touch mode.

Figure 18:
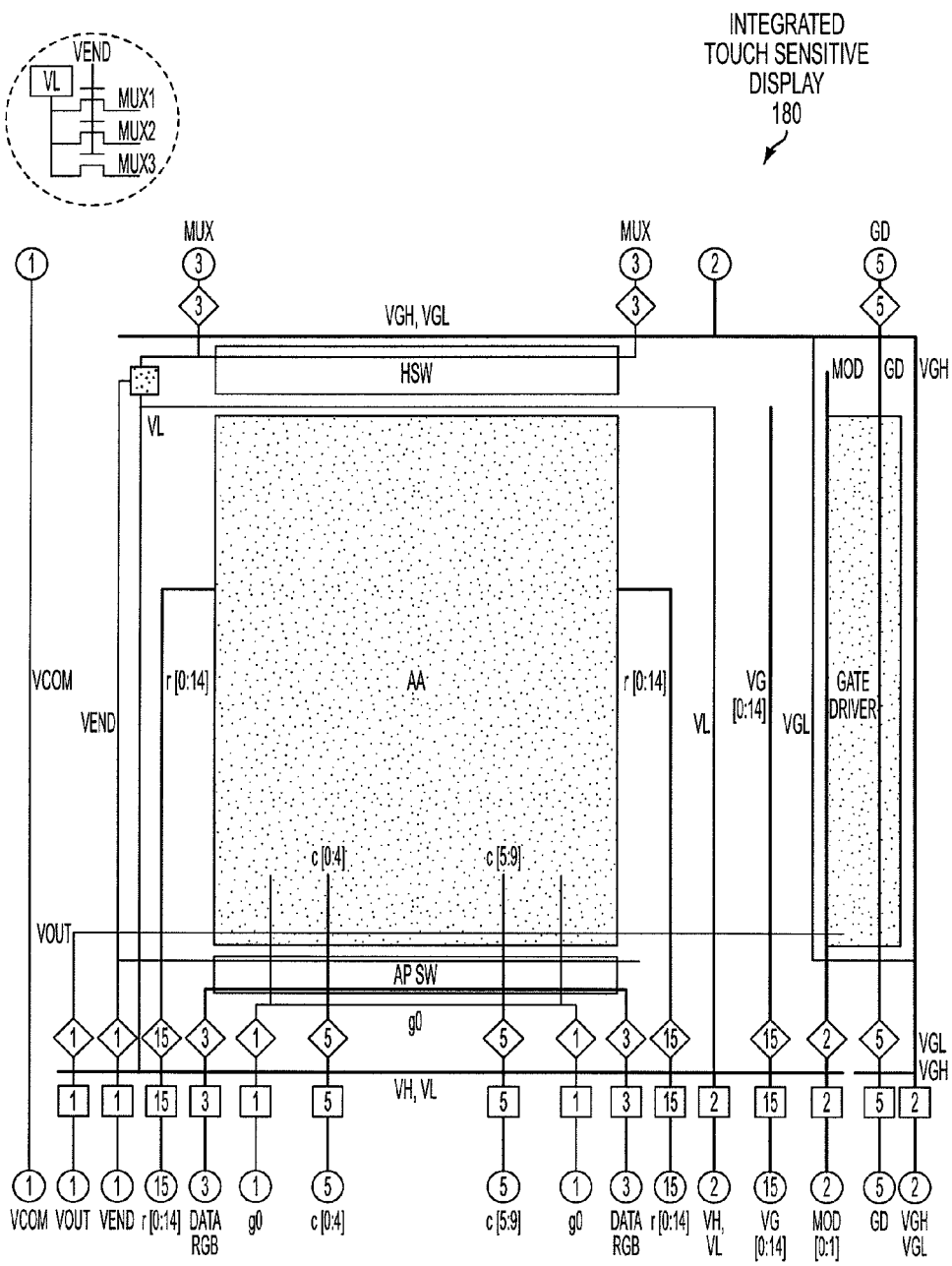
FIG. 18 illustrates another exemplary layout of an integrated touch sensitive display according to various embodiments.

FIG. 18 illustrates another exemplary layout of an integrated touch sensitive display according to various embodiments. In the example of FIG. 18, integrated touch sensitive display 180 can include an LCD driver that can drive the display pixels in the active display/touch area (AA) in a display mode, a touch controller that can drive the pixels in the AA in a touch mode, and a gate driver that can drive gate lines of the AA, where the gate lines can switch voltage supplies to the AA between display and touch modes according to various embodiments. The display can include a Vcom line (VCOM) that can carry a common voltage for the display, r[0:14] lines that can transmit stimulation signals to the drive regions of the AA, c[0:9] lines that can receive sense signals from the sense regions of the AA, data lines (DataRGB) that can transmit data signals to the display pixels of the AA, control lines (MOD[0:1]) that can control various switching, such as switching components between display and touch modes, touch voltage lines (VH, VL) that can transmit touch voltage to the gate driver from the touch circuitry, LCD voltage lines (VGH, VGL) that can transmit LCD voltage to the gate driver from the LCD driver, g0 and g1 lines that can connect data lines and ground regions, respectively, to virtual grounds, and ground voltage lines (VG[0:14]) that can transmit ground voltage from the touch circuitry ground to the gate driver. In this example, each ground voltage lines VG can couple to a corresponding group of gate lines. In some embodiments, one or more gate lines can couple to a corresponding voltage line to be driven by that voltage line, depending on the needs of the display. The display circuit can also include a hardware switch (HSW) and a second switch (AP SW) that can control various switching, such as connecting data lines of the AA to corresponding data outputs from the LCD driver during the display mode and disconnecting the data lines during the touch mode, etc. In this example, the gate driver is shown to the right of the AA. It is to be understood that the gate driver can be on either side of the AA or that multiple gate drivers can be used on either or both sides of the AA, depending on the needs, application, available surface area, etc., of the display. In some embodiments, there can be multiple gate drivers per voltage line.

Figure 19:
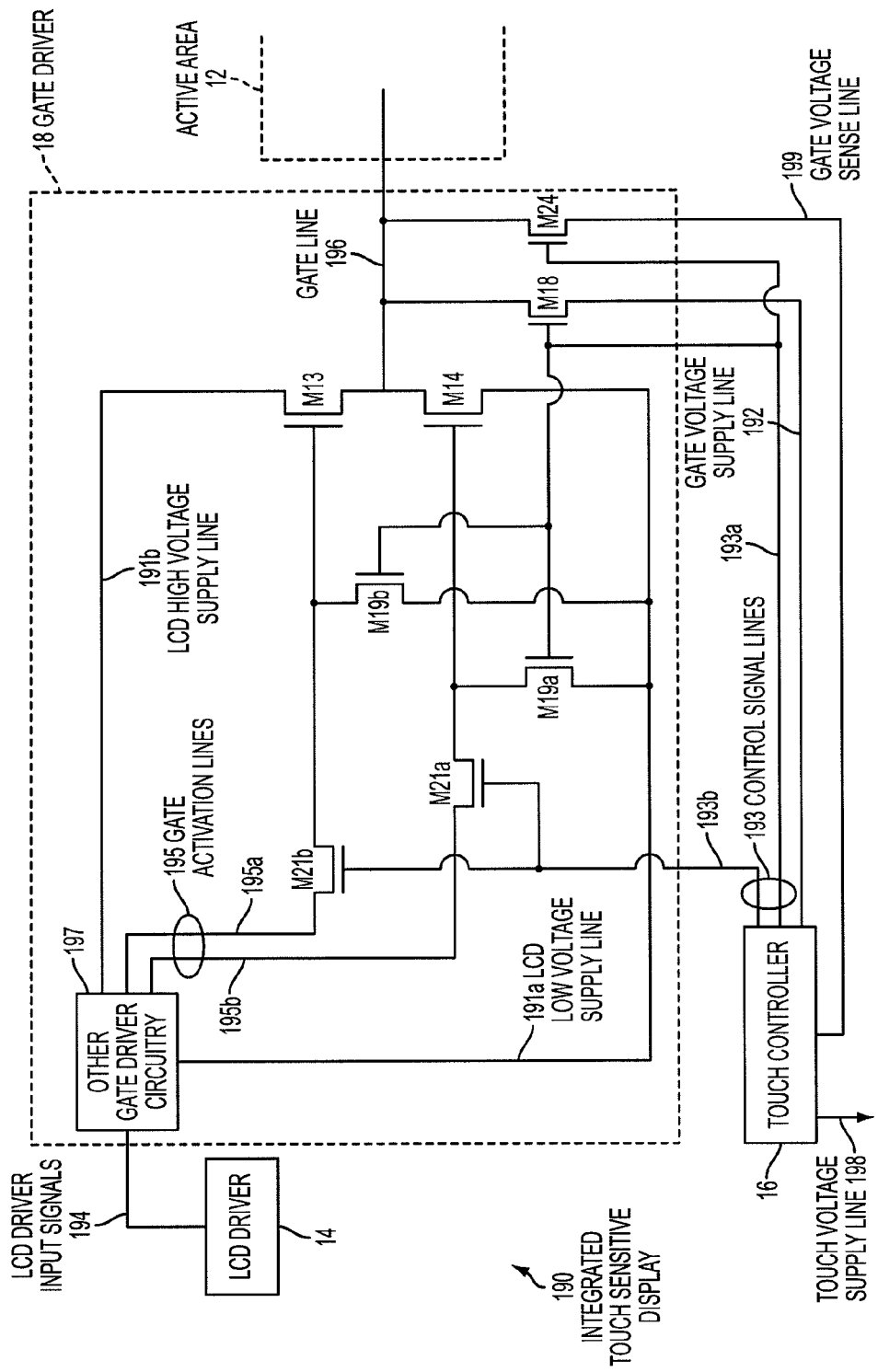
FIG. 19 illustrates another exemplary gate driver that can switch between voltage supplies to gate lines in an active display/touch area of an integrated touch sensitive display for display and touch modes according to various embodiments.

FIG. 19 illustrates another exemplary gate driver that can switch between voltage supplies to gate lines in an active display/touch area of an integrated touch sensitive display for display and touch modes according to various embodiments. The gate driver of FIG. 19 can be similar to the gate drivers of FIGS. 11 and 14 with the following addition. The gate driver of FIG. 19 can have a feedback loop that can include transistor M18 and new transistor M24. The feedback loop can be used to insure that gate line 196 is sufficiently grounded during touch mode so as to reduce or eliminate interference from display circuitry to touch circuitry that could adversely affect touch sensing. Transistor M24 can have connections to its gate, source, and drain that can include a connection to a control signal line 193a from touch controller 16, a connection to gate voltage sense line 199 from the touch controller, and a connection to the gate line 196.

During operation, in touch mode, the touch controller 16 can output a high control signal along the signal line 193a to activate the transistor M24 to sense the voltage on the gate line 196. The transistor M24 can feed back a signal indicative of the sensed voltage along the gate voltage sense line 199 to the touch controller 16. The touch controller 16 can adjust the gate voltage to the gate line 196 via the gate voltage supply line 192 so that the gate line 196 is sufficiently grounded to reduce or eliminate interference to the touch circuitry that could affect the touch sensing. The signal along the signal line 193a can also activate the transistor M18 to pass the adjusted gate voltage from the supply line 192 to the gate line 196. The voltage on the gate line 196 can be a low voltage, e.g., about −5V in some embodiments, to keep the corresponding display pixels in the active area 12 from refreshing and/or interfering with the touch circuitry. The control signal along the signal line 193a can also activate the transistors M19a and M19b to block undesirable fluctuating voltage from the LCD driver 14 to the gate line 196. Transistor M19b can block the transistor M13 from affecting the gate line voltage. For example, the transistor M19b can ensure that the transistor M13 is turned off, causing the output (and in some cases the input) of the transistor M13 to float. Similarly, transistor M19a can block the transistor M14 from affecting the gate line voltage. For example, the transistor M19a can ensure that the transistor M14 is turned off, causing the output (and in some cases the input) of the transistor M14 to float. The control signal on signal line 193b can be low or off so that the transistors M21a and M21b can be switched off, which in turn can switch transistors M13 and M14 off, to avoid transmitting undesirable fluctuating voltage from the LCD driver 14 to the gate line 196. The output from the transistor M18 can replace the floating output of the transistors M13 and/or M14 in this example.

During operation, in display mode, the control signal on signal line 193*a* can be low or off so that the transistor M18 and the transistor M24 can be switched off to avoid transmitting voltage from the touch controller 16 to the gate line 196 and the transistors M19*a* and M19*b* can be switched off to avoid blocking the LCD voltage and/or other LCD signals. Gate activation signals on gate activation lines 195 from the other gate driver circuitry 197 can activate the transistor M13 to pass an LCD high voltage from the supply line 191*b* to the gate line 196 or the transistor M14 to pass an LCD low voltage from the supply line 191*a* to the gate line 196. The touch controller 16 can output a high control signal along the signal line 193*b* to activate the transistors M21*a* and M21*b* to send the gate activation signals to transistors M13 and M14 to pass an LCD voltage and/or other LCD signals from the supply line 191*a* or the supply line 191*b* to the gate line 196. The gate activation signal lines 195*a* and 195*b* can transmit gate activation signals that can be inverses of each other, such that, when a high activation signal is transmitted on signal line 195*a* to the transistor M13 to pass an LCD high voltage, the inverse low activation signal can be transmitted on signal line 195*b* to the transistor M14 to switch it off so as not to pass an LCD low voltage at the same time, and vice versa. The voltage to the gate line 196 can range from a low voltage to a high voltage, e.g., about −5V to +5V in some embodiments, to cause the corresponding display pixels in the active area 12 to refresh to display new image and/or graphics data.

In this example, transistors are used for the switching. Other switches, e.g., multiplexers, logic gates, latches, etc., can also be used.

The example in FIG. 19 illustrates gate driver circuitry associated with one gate line. It is to be understood that similar circuitry can be used for the other gate lines in the integrated touch sensitive display. In some embodiments, the gate line voltage can be sensed for each pixel connected to that gate line (e.g., in the same row of the active area 12) and combined to provide the feedback signal used to adjust the gate line voltage for that gate line.

An exemplary method for switching gate driver circuitry of an integrated touch sensitive display between display and touch modes can be as follows. This method can be used with the example gate driver of FIG. 19, for example. A determination can be made whether the integrated touch sensitive display is in display mode or touch mode. The mode can be determined, for example, based on a user input, a device input, an algorithm input, etc., which can either select or indicate the mode. If the display is determined to be in display mode, the gate driver can receive a control signal to switch the connections between the gate driver and the gate lines in the active area of the display so that the gate driver can transmit voltage from the LCD driver to the gate lines. One or more switches, such as shown in FIG. 19, for example, can be configured to connect the LCD voltage supply line to the active area gate lines. The gate driver can transmit the LCD voltage to the gate lines via the connections. If the display is determined to be in touch mode, the gate driver can receive a control signal to switch the connections between the gate driver and the active area gate lines so that the gate driver can transmit voltage from the touch controller to the gate lines. One or more switches, such as shown in FIG. 19, for example, can be configured to connect the gate voltage supply line to the active area gate lines. The feedback loop can be activated to sense and adjust the gate line voltage in order to reduce or eliminate circuitry interference that could affect the touch sensing. The gate driver can transmit the gate line voltage to the gate lines via the connections.

Additional and/or other method tasks can be performed according to various embodiments.

Figure 20:
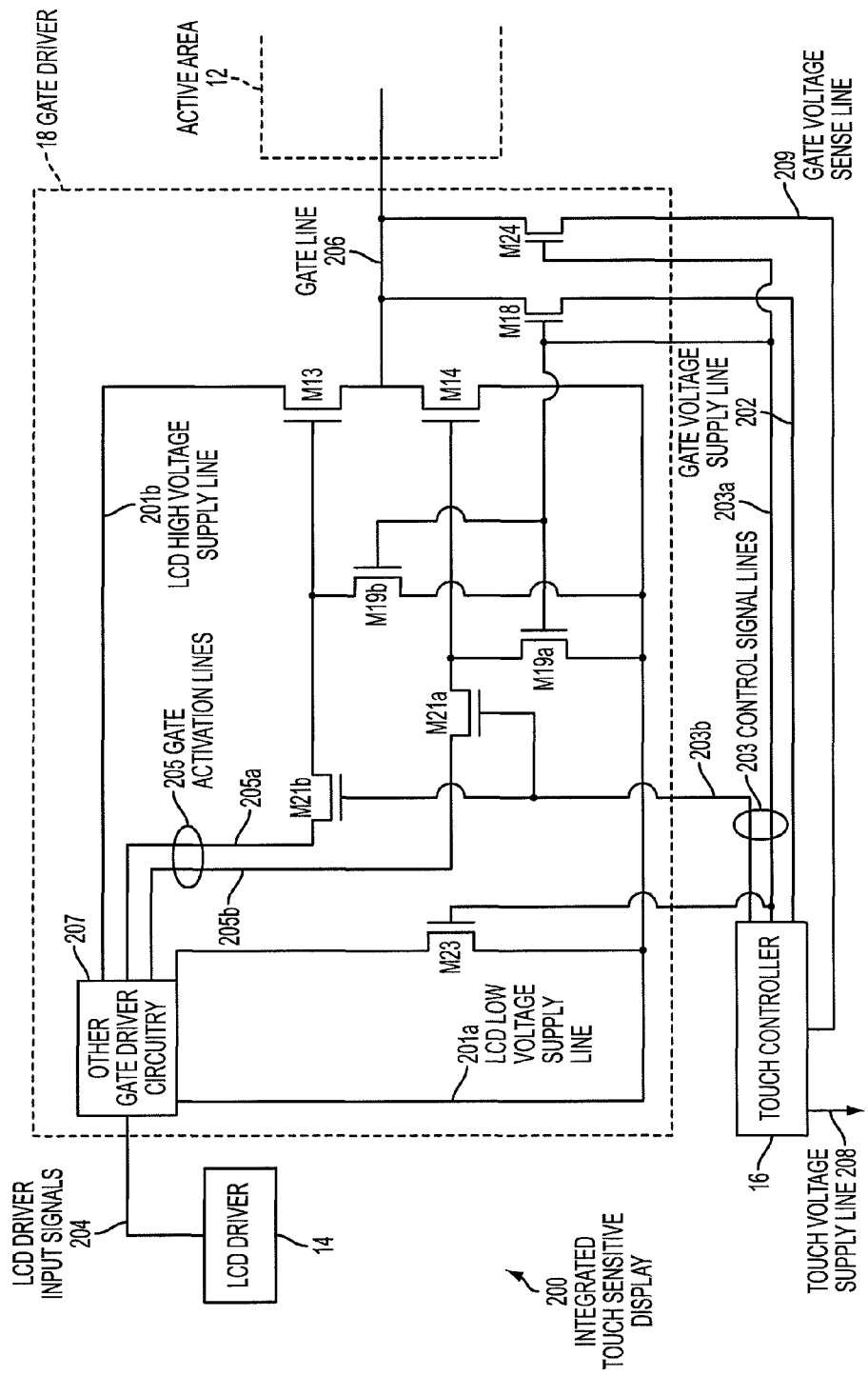
FIG. 20 illustrates still another exemplary gate driver that can switch between voltage supplies to gate lines in an active display/touch area of an integrated touch sensitive display for display and touch modes according to various embodiments.

FIG. 20 illustrates still another exemplary gate driver that can switch between voltage supplies to gate lines in an active display/touch area of an integrated touch sensitive display for display and touch modes according to various embodiments. The gate driver of FIG. 20 can be similar to the gate driver of FIG. 19 with the following addition. The gate driver of FIG. 20 can include new transistor M23, which can be used to insure, during the touch mode when the display clocks can be static for some time, that the logic state of certain driver nodes are held for when the display changes to the display mode. The display clocks can be disabled during touch mode to reduce or eliminate interference from the clock signals to the touch circuitry that could affect the touch sensing. Since the normal clock period is only a fraction of a touch period, the clocks could be disabled for some time. As a result, the logic state of the device could be lost and cause problems when the clocks resume. The transistor M23 can be used to hold the logic state. The transistor M23 can have connections to its gate, source, and drain that can include a connection to a control signal line 203*a* from touch controller 16, a connection to LCD voltage supply line 201*a* from the gate driver circuitry 208, and a connection to the driver nodes in the gate driver circuitry.

During operation, in touch mode, the touch controller 16 can output a high control signal along the signal line 203*a* to activate the transistor M23 to transmit voltage from the LCD voltage supply line 201*a*, thereby causing the driver nodes to hold the logic state until the display clocks become active, e.g., during display mode. The remaining components of the gate driver 18 can operate as previously described in FIG. 19.

During operation, in display mode, the control signal on signal line 203*a* can be low or off so that the transistor M23 can be switched off allow the logic state of certain driver nodes to update. The remaining components of the gate driver 18 can operate as previously described in FIG. 19.

In this example, transistors are used for the switching. Other switches, e.g., multiplexers, logic gates, latches, etc., can also be used.

An exemplary method for switching gate driver circuitry of an integrated touch sensitive display between display and touch modes can be the same or similar to that described regarding FIG. 19, with the following additional action. During touch mode, circuitry can be activated to insure that the logic state of the display can be held. This method can be used with the example gate driver of FIG. 20, for example. Additional and/or other method tasks can be performed according to various embodiments.

Figure 21:
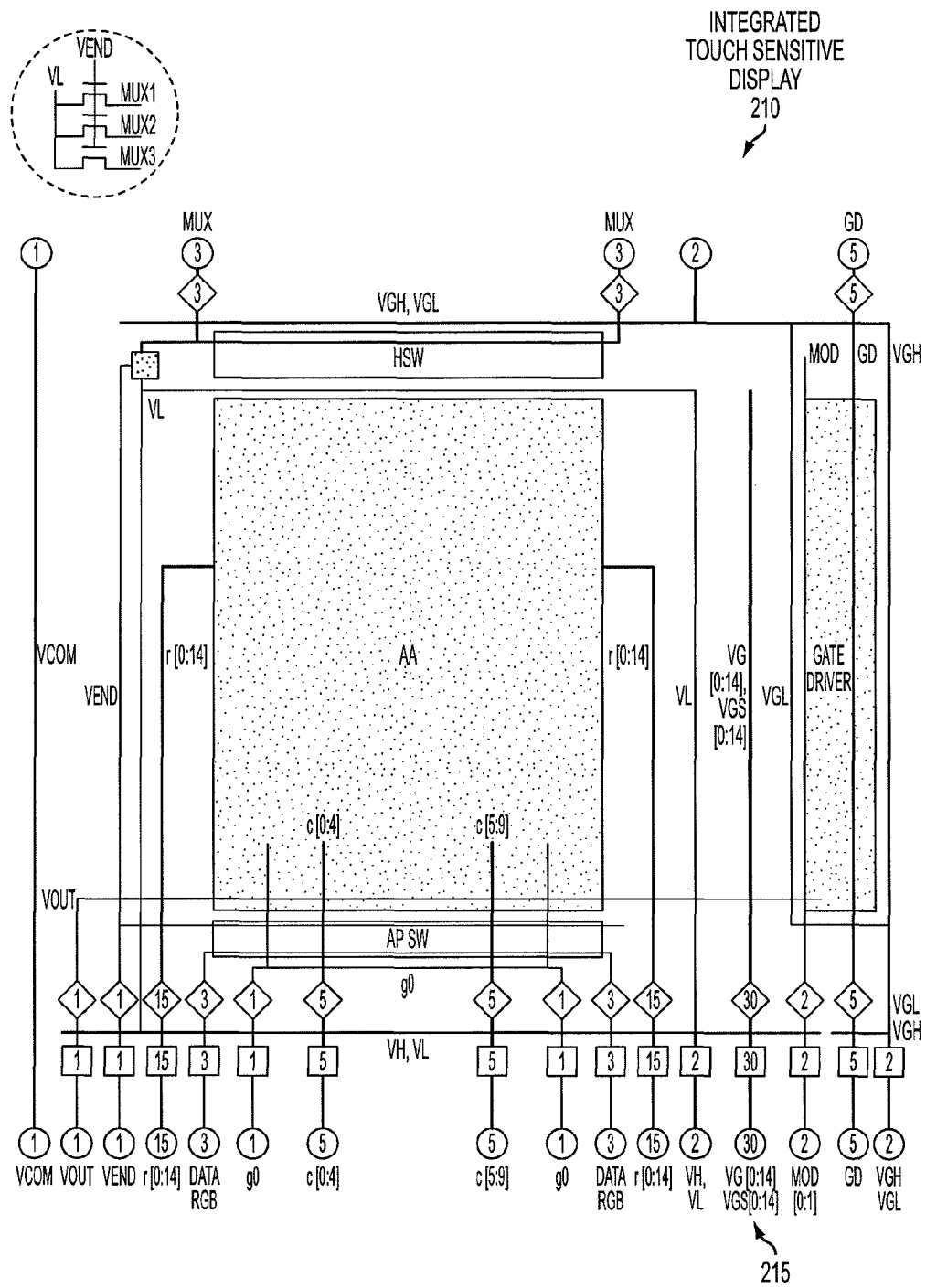
FIG. 21 illustrates another exemplary layout of an integrated touch sensitive display according to various embodiments.

FIG. 21 illustrates an exemplary layout of an integrated touch sensitive display according to various embodiments. The layout of FIG. 21 can be the same or similar to the layout of FIG. 18 with the following addition. The integrated touch sensitive display 210 of FIG. 21 can include gate voltage sense lines (VGS[0:14]) 215 that can transmit signals from corresponding gate lines, indicative of the corresponding gate lines' voltages, to touch controller circuitry, where the signals can be used to adjust the gate lines' voltages in order to reduce or eliminate interference from the display circuitry during touch mode. As described previously, the gate voltage sense lines can form feedback loops with the gate voltage supply lines (VG[0:14]) 215. In this example, the number of sense lines and supply lines 215 can be the same so that each supply line can have a corresponding sense line. In this example, a group of gate lines can be driven by the same gate voltage supply line 215. Similarly, a group of gate lines can be sensed by the same gate voltage sense line 215. There can be multiple gate drivers per VG and VGS line. In some embodiments, one or more gate lines can be associated with a VG line and a VGS line, depending on the needs of the display. It is to be understood that other configurations can also be used.

Figure 22:
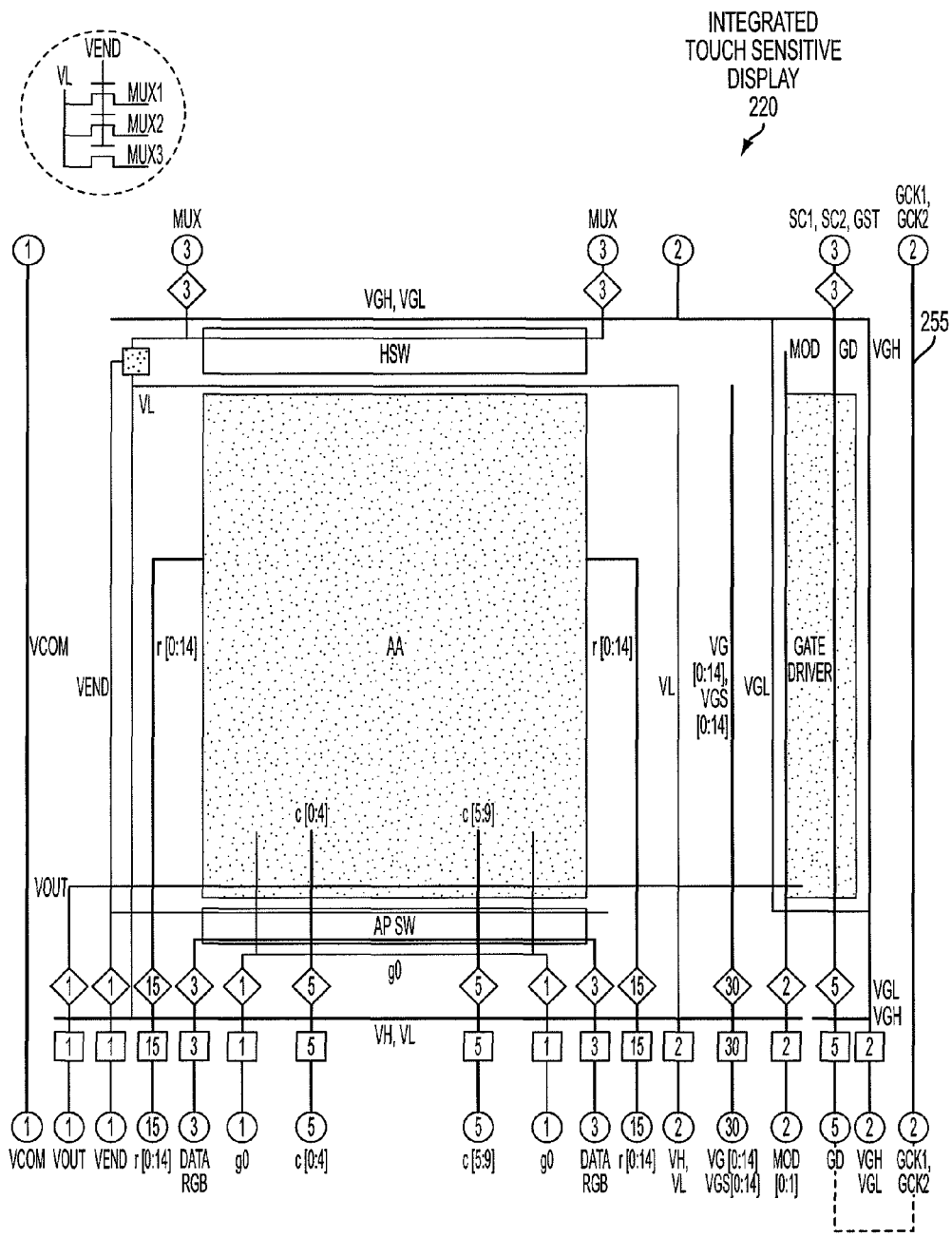
FIG. 22 illustrates still another exemplary layout of an integrated touch sensitive display according to various embodiments.

FIG. 22 illustrates another exemplary layout of an integrated touch sensitive display according to various embodiments. The layout of FIG. 22 can be the same or similar to the layout of FIG. 21 with the following addition. The integrated touch sensitive display 220 of FIG. 22 can include gate clock lines (GCK1, GCK2) 225 that can transmit display clock signals to control circuitry, where the signals can be disabled during touch mode in order to reduce or eliminate interference from the display clock signals that could affect the touch sensing. Since the clock signals can be ignored during touch mode, rather than transmitting the clock signals directly from the LCD driver to the gate driver, the clock signals can be transmitted to control circuitry that can disable the clocks during touch mode. The control circuitry can then transmit new signals, indicating that the clocks have been disabled, to the gate driver. As a result, the new signals may not interfere with the touch circuitry during touch mode. During display mode, the control circuitry can enable the clock signals and transmit the new signals to the gate driver.

Figure 23:
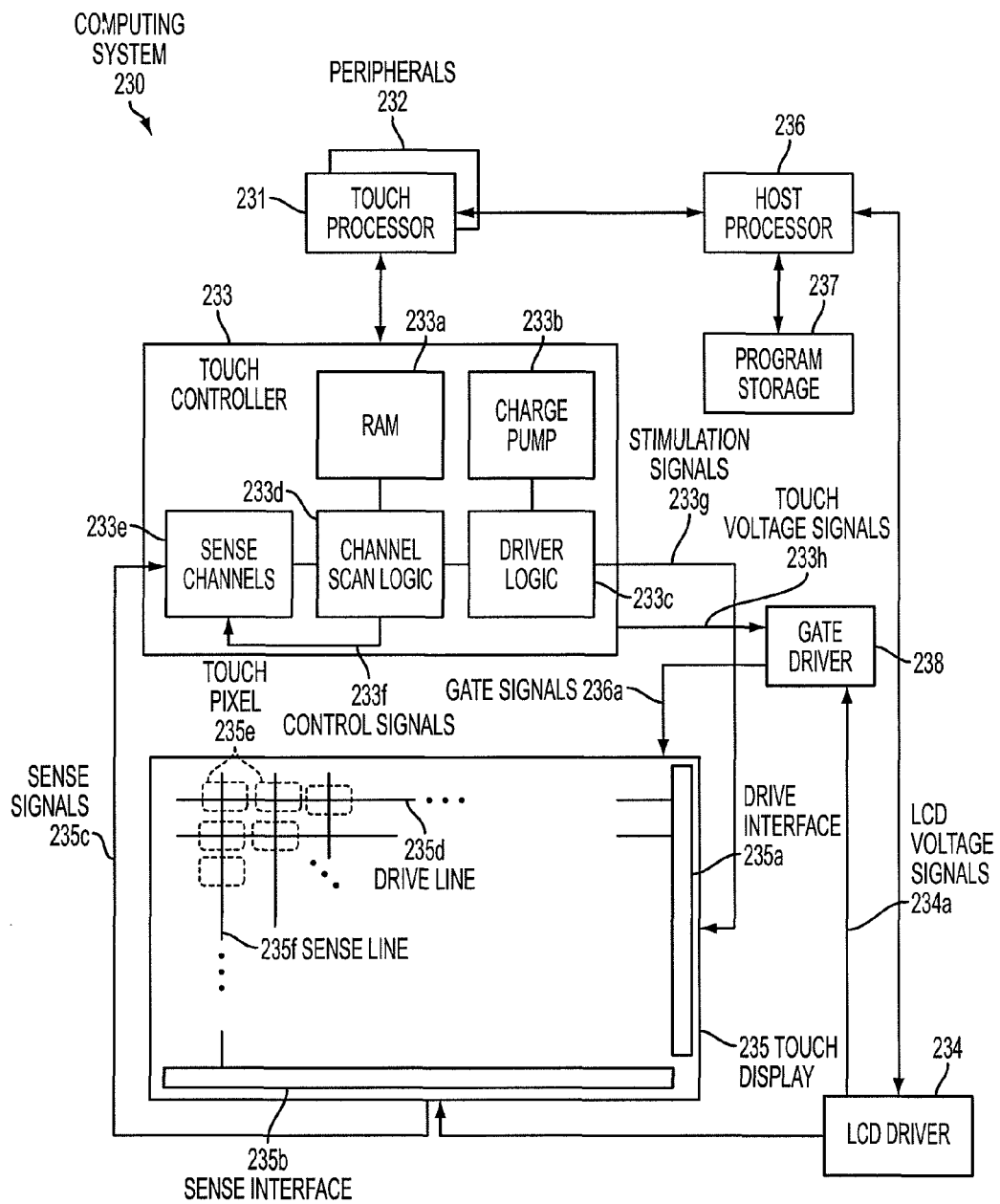
FIG. 23 illustrates an exemplary computing system having an integrated touch sensitive display with switchable gate driver circuitry according to various embodiments.

FIG. 23 illustrates an exemplary computing system that can include an integrated touch sensitive display according to various embodiments described herein. In the example of FIG. 23, computing system 230 can include one or more touch processors 231, peripherals 232, a touch controller 233, and touch sensing circuitry (described in more detail below). Peripherals 232 can include, but are not limited to, random access memory (RAM) or other types of memory or storage, watchdog timers and the like. Touch controller 233 can include, but is not limited to, one or more sense channels 233e, channel scan logic 233d, and driver logic 233c. Channel scan logic 233d can access RAM 233a, autonomously read data from the sense channels and provide control for the sense channels. In addition, channel scan logic 233d can control driver logic 233c to generate stimulation signals 233g at various frequencies and phases that can be selectively applied to drive regions of the touch sensing circuitry of touch display 235, as described in more detail below. In some embodiments, touch controller 233, touch processor 231, and peripherals 232 can be integrated into a single application specific integrated circuit (ASIC).

Computing system 230 can also include a host processor 236 for receiving outputs from touch processor 231 and performing actions based on the outputs. For example, host processor 236 can be connected to program storage 237 and a display controller, such as LCD driver 234. Host processor 236 can use LCD driver 234 to generate an image on touch display 235, such as an image of a user interface (UI), and can use touch processor 231 and touch controller 233 to detect a touch on or near touch display 235, such a touch input to the displayed UI. The touch input can be used by computer programs stored in program storage 237 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 236 can also perform additional functions that may not be related to touch processing.

Touch display 235 can include touch sensing circuitry that can include a capacitive sensing medium having drive lines 235d and sense lines 235f. It should be noted that the term "lines" can sometimes be used herein to mean simply conductive pathways, as one skilled in the art can readily understand, and is not limited to structures that can be strictly linear, but can include pathways that change direction, and can include pathways of different size, shape, materials, etc. Drive lines 235d can be driven by stimulation signals 233g from driver logic 233c through a drive interface 235a, and resulting sense signals 235c generated in sense lines 235f can be transmitted through a sense interface 235b to sense channels 233e in touch controller 233. In this way, drive lines and sense lines can be part of the touch sensing circuitry that can interact to form capacitive sensing nodes, which can be thought of as touch picture elements (touch pixels), such as touch pixels 235e. This way of understanding can be particularly useful when touch display 235 can be viewed as capturing an "image" of touch. In other words, after touch controller 233 has determined whether a touch has been detected at each touch pixel in the touch display, the pattern of touch pixels in the touch display at which a touch occurred can be thought of as an "image" of touch (e.g. a pattern of fingers touching the touch display).

Computing system 230 can include gate driver 238, which can receive voltage signals 234a (and other inputs) from the LCD driver 234 to drive gate lines of the touch display 235 so that image and/or graphics data can be displayed on the display. The gate driver 238 can also receive voltage signals 233h from the touch controller 233 to replace the LCD voltage signals 234a when the touch display 235 senses a touch in order to reduce adverse influence, e.g., interference, of the LCD signals on the touch display that can result in a false touch image. The gate driver 238 can transmit either the LCD voltage signals 234a or the touch voltage signals 233h as gate line signals 238a to the touch display 235. The touch controller 233 can control which of either the LCD signals or the touch signals the gate driver 238 can transmit to the touch display 235. In some embodiments, the LCD driver 234 can control which signals. In some embodiments, the gate driver 238 can control which signals. In some embodiments, other computing blocks of the computing system 230 can individually or in combination with the touch controller and/or the LCD driver control which signals.

Note that one or more of the functions described above can be performed by firmware stored in memory (e.g. one of the peripherals 232 in FIG. 23) and executed by touch processor 231, or stored in program storage 237 and executed by host processor 236. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer-readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the touch display is not limited to touch, as described in FIG. 23, but may be a proximity display or any other display having switchable gate driver circuitry according to various embodiments. In addition, the touch display described herein can be either a single-touch or a multi-touch sensor panel.

Figure 24:
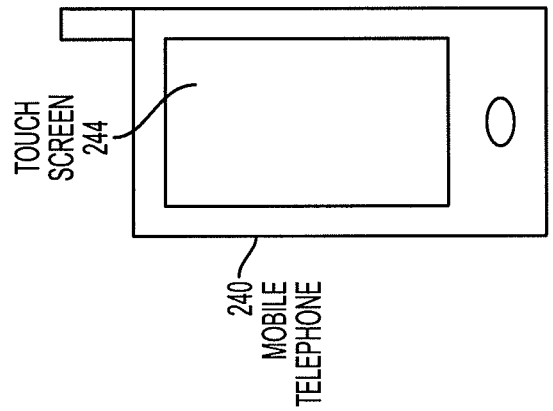
FIG. 24 illustrates an exemplary mobile telephone having an integrated touch sensitive display with switchable gate driver circuitry according to various embodiments.

FIG. 24 illustrates an exemplary mobile telephone 240 that can include touch screen 244 and/or another integrated touch sensitive display and other computing system blocks that can include gate driver circuitry switchable between display and touch modes of the telephone.

Figure 25:
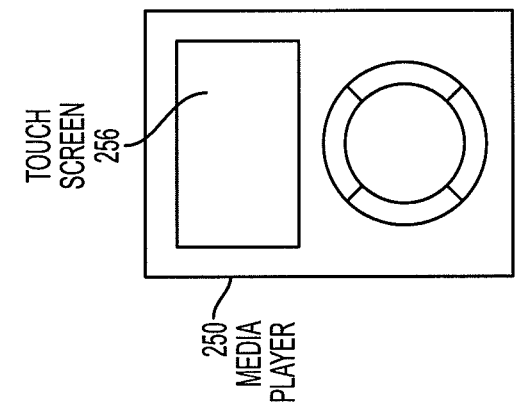
FIG. 25 illustrates an exemplary digital media player having an integrated touch sensitive display with switchable gate driver circuitry according to various embodiments.

FIG. 25 illustrates an exemplary digital media player 250 that can include touch screen 254 and/or another integrated touch sensitive display and other computing system blocks that can include gate driver circuitry switchable between display and touch modes of the media player.

Figure 26:
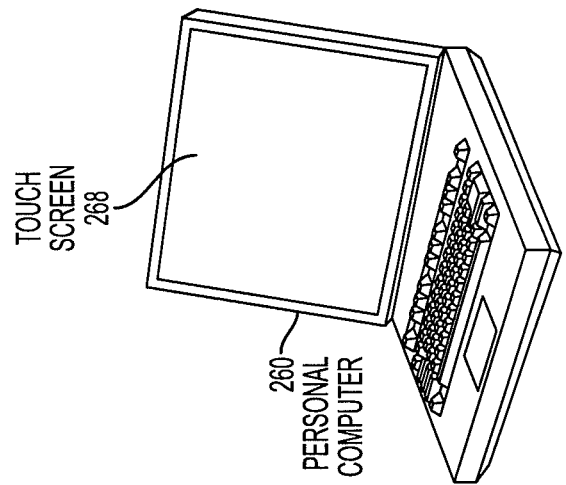
FIG. 26 illustrates an exemplary personal computer having an integrated touch sensitive display with switchable gate driver circuitry according to various embodiments.

FIG. 26 illustrates an exemplary personal computer 260 that can include touch screen 264 and/or another integrated touch sensitive display and other computing system blocks that can include gate driver circuitry switchable between display and touch modes of the personal computer.

The mobile telephone, media player, and personal computer of FIGS. 24 through 26 can be thinner, lighter, cost saving, and power saving with an integrated touch sensitive display having gate driver circuitry switchable between display and touch modes according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch sensitive display comprising:
a first drive region comprising a first plurality of display pixels;
a second drive region comprising a second plurality of display pixels;
a sense region disposed between the first and second drive regions and comprising a third plurality of display pixels;
conductive lines electrically connecting together at least some of the display pixels of the first and second drive regions along first and second directions and electrically bypassing the third plurality of display pixels in the sense region;
each display pixel having a gate, wherein a plurality of display pixels have their gates connected to a gate line; and
at least one switch configured to switch the gate line between a first configuration and a second configuration, the first configuration for switchably connecting the gate line to a first voltage during a display function and the second configuration for switchably connecting the gate line to a second voltage during a touch sensing function, the second voltage being different from the first voltage.

2. The circuit of claim 1, wherein the first configuration comprises the gate line being switched to receive a display voltage signal generated by the display circuitry.

3. The circuit of claim 1, wherein the second configuration comprises the gate line being switched to receive a touch voltage signal generated by the touch circuitry.

4. The circuit of claim 1, wherein the second configuration comprises the gate line being switched to receive an active ground voltage signal from the touch circuitry.

5. The circuit of claim 1, wherein the second configuration comprises the voltage on the another voltage supply being sensed and adjusted to reduce interference from the display circuitry.

6. The circuit of claim 1, wherein the second configuration comprises a logic state of the display being held so that the logic state can be accessed when the display switches to the first configuration.

7. The circuit of claim 1, wherein the second configuration comprises a display clock being disabled during the second configuration.

8. The circuit of claim 1 incorporated into at least one of a mobile telephone, a digital media player, or a personal computer.

9. A method for use in an integrated touch sensitive display, the method comprising:
providing a first drive region comprising a first plurality of display pixels;
providing a second drive region comprising a second plurality of display pixels;
providing a sense region disposed between the first and second drive regions and comprising a third plurality of display pixels;
providing conductive lines electrically connecting together at least some of the display pixels of the first and second drive regions along first and second directions and electrically bypassing the third plurality of display pixels in the sense region;
providing a gate for each display pixel,
providing a gate line, wherein a plurality of display pixels have their gates connected to the gate line;
receiving a signal indicative of one of a display mode and a touch mode;
configuring the gate line of the display to connect to a first voltage supply during the display mode based on the received signal; and
configuring the gate line to connect to a second voltage supply during the touch mode based on the received signal.

10. The method of claim 9, wherein a voltage from the first voltage supply is incompatible with the touch mode.

11. The method of claim 9, wherein the configuring to the first voltage supply comprises configuring the gate line to connect to a display driver during displaying of an image on the display.

12. The method of claim 9, wherein the configuring to the second voltage supply comprises configuring the gate line to connect to a touch circuit during sensing of a touch on the display.

13. The method of claim 9, wherein the configuring to the second voltage supply comprises configuring the gate line to connect to an active ground during sensing of a touch on the display.

14. An integrated touch sensitive display comprising:
a first drive region comprising a first plurality of display pixels;
a second drive region comprising a second plurality of display pixels;
a sense region disposed between the first and second drive regions and comprising a third plurality of display pixels;
conductive lines electrically connecting together at least some of the display pixels of the first and second drive regions along first and second directions and electrically bypassing the third plurality of display pixels in the sense region;
each display pixel having a gate, wherein a plurality of display pixels have their gates connected to a gate line; and
a circuit having at least one switch configured to switchably transmit a first voltage from a first voltage source to the gate line during a display mode of the display and a second voltage from a second voltage source to the gate line during a touch mode of the display.

15. The display of claim 14, further comprising:
a display driver configured to send the first voltage to the circuit to be switchably selected during the display mode.

16. The display of claim 14, further comprising:
a touch controller configured to send the second voltage to the circuit to be switchably selected during the touch mode.

17. The display of claim 14, wherein the circuit is distant from the at least one display pixel so as to reduce interference with the at least one display pixel by inputs to the circuit.

18. The display of claim 14, further comprising:
a feedback controller configured to sense the second voltage on the gate line and to adjust the second voltage transmitted to the gate line based on the sensed voltage in order to reduce interference from the gate line on the display during the touch mode.

19. The display of claim 14, wherein the circuit comprises at least another switch configured to switch a node of the circuit to hold a logic state during the touch mode and to allow the node to update the logic state during the display mode.

20. The display of claim 14, further comprising:
a clock controller configured to disable a clock signal during the touch mode and to enable the clock signal during the display mode.

21. A system comprising:
a first drive region comprising a first plurality of display pixels;
a second drive region comprising a second plurality of display pixels;
a sense region disposed between the first and second drive regions and comprising a third plurality of display pixels;
conductive lines electrically connecting together at least some of the display pixels of the first and second drive regions along first and second directions and electrically bypassing the third plurality of display pixels in the sense region;
each display pixel having a gate, wherein a plurality of display pixels have their gates connected to a gate line; and
multiple voltage supplies;
an active area connectible to the voltage supplies and configured to operate during a display mode and a touch mode, the active area comprising at least the first and second drive regions and the sense region; and
a circuit configured to connect the active area to at least one of the voltage supplies to supply a first voltage to the active area during the display mode and to connect the active area to at least another of the voltage supplies to supply a second voltage to the active area during the touch mode.

22. The system of claim 21, wherein the at least one voltage supply is a display driver configured to drive the active area to display an image and the at least another voltage supply is a touch controller configured to drive the active area to sense a touch and to control which of the voltage supplies the circuit connects the active area to.

23. The system of claim 21, wherein the at least another voltage supply is an active ground that splits a ground voltage to individually supply each row of the active area during the touch mode.

24. The system of claim 21, wherein the voltage supplies, the active area, and the circuit are integrally formed on a chip.

25. A touch sensitive display comprising:
a first drive region comprising a first plurality of display pixels;
a second drive region comprising a second plurality of display pixels;
a sense region disposed between the first and second drive regions and comprising a third plurality of display pixels;
conductive lines electrically connecting together at least some of the display pixels of the first and second drive regions along first and second directions and electrically bypassing the third plurality of display pixels in the sense region;
each display pixel having a gate, wherein a plurality of display pixels have their gates connected to a gate line; and
at least one switch configured to transmit a voltage from a selected voltage supply to the gate line during a touch mode and to become inactive during a display mode.

* * * * *

UNITED STATES PATENT AND TRADEMARK OFFICE
CERTIFICATE OF CORRECTION

PATENT NO.         : 8,537,126 B2                                                                 Page 1 of 1
APPLICATION NO.    : 12/545669
DATED              : September 17, 2013
INVENTOR(S)        : Marduke Yousefpor et al.

It is certified that error appears in the above-identified patent and that said Letters Patent is hereby corrected as shown below:

In the Claims:

At column 28, claim number 5, line number 24, please delete "The circuit of claim 1, wherein the second configuration comprises the voltage on the another voltage supply being sensed and adjusted to reduce interference from the display circuitry." and insert -- The circuit of claim 1, wherein the second configuration comprises the second voltage being sensed and adjusted to reduce interference from the display circuitry. --

Signed and Sealed this
Twelfth Day of August, 2014

Michelle K. Lee
*Deputy Director of the United States Patent and Trademark Office*